US011144688B1

(12) United States Patent
Ershov et al.

(10) Patent No.: US 11,144,688 B1
(45) Date of Patent: Oct. 12, 2021

(54) VIRTUAL REPEATER INSERTION

(71) Applicant: Diakopto, Inc., San Jose, CA (US)

(72) Inventors: Maxim Ershov, San Jose, CA (US); Andrei Tcherniaev, Los Gatos, CA (US)

(73) Assignee: Diakopto, Inc., San Jose, CA (US)

( * ) Notice: Subject to any disclaimer, the term of this patent is extended or adjusted under 35 U.S.C. 154(b) by 0 days.

(21) Appl. No.: 16/714,951

(22) Filed: Dec. 16, 2019

Related U.S. Application Data

(60) Provisional application No. 62/780,863, filed on Dec. 17, 2018.

(51) Int. Cl.
*G06F 30/31* (2020.01)
*G06F 30/327* (2020.01)

(52) U.S. Cl.
CPC ............ *G06F 30/31* (2020.01); *G06F 30/327* (2020.01)

(58) Field of Classification Search
CPC ...................................................... G06F 30/31
USPC ........................................................ 716/114
See application file for complete search history.

(56) References Cited

U.S. PATENT DOCUMENTS

| | | |
|---|---|---|
| 5,767,542 A | 6/1998 | Nakamura |
| 6,381,730 B1 | 4/2002 | Chang |
| 6,591,402 B1 | 7/2003 | Chandra |
| 6,956,424 B2 | 10/2005 | Hohnel |
| 7,669,152 B1 | 2/2010 | Tcherniav |
| 7,756,472 B2 | 7/2010 | Darabi |
| 7,882,471 B1 | 2/2011 | Kariat |
| 8,099,699 B2 | 1/2012 | Charlet |
| 8,146,032 B2 | 3/2012 | Chen |
| 8,195,439 B1 | 6/2012 | Hussain |
| 8,261,228 B1 | 9/2012 | Gopalakrishnan |
| 8,312,406 B2 | 11/2012 | Song |
| 8,407,646 B2 | 3/2013 | Chandramohan |

(Continued)

FOREIGN PATENT DOCUMENTS

CN 109948263 A 6/2019

OTHER PUBLICATIONS

H. Zarrabi, A. Al-Khalili and Y. Savaria, "Vt-conscious repeater insertion in power-managed VLSI," 2014 International Symposium on Integrated Circuits (ISIC), Singapore, Dec. 10, 2014, pp. 99-102.

(Continued)

*Primary Examiner* — Eric D Lee
(74) *Attorney, Agent, or Firm* — Marc P. Schuyler

(57) ABSTRACT

A computer/software tool for electronic design automation (EDA) uses parasitic elements from a post-layout netlist (PLN) file for a given IC design to assess routing-imposed RC-based signal degeneration. The computer/software tool facilitates selection of, and insertion location for, one or more "virtual repeaters," based on modification to the PLN file. The tool generates a visual display based on the calculated design characteristics, facilitating adjustment and optimization of repeater cell and location by the designer. The repeater insertion is "virtual," because modeling and adjustment can be based on abstractions (e.g., load capacitance presented by a repeater) and the already-extracted netlist file, and because an actual circuit design need not be created until after a designer has fine-tuned repeater insertion parameters.

31 Claims, 8 Drawing Sheets

(3 of 8 Drawing Sheet(s) Filed in Color)

(56) References Cited

U.S. PATENT DOCUMENTS

| | | | |
|---|---|---|---|
| 8,453,102 B1 | 5/2013 | Pack | |
| 8,656,331 B1 | 2/2014 | Sundareswaran | |
| 8,700,377 B2 | 4/2014 | Bolcato | |
| 8,799,839 B1 | 8/2014 | Tetelbaum | |
| 8,856,720 B2 | 10/2014 | Veh | |
| 8,954,917 B1 | 2/2015 | Shu | |
| 9,141,740 B2 | 9/2015 | Liu | |
| 9,147,034 B1 | 9/2015 | Hawkins | |
| 10,762,259 B1 | 9/2020 | Ershov | |
| 10,783,296 B1 | 9/2020 | Ershov | |
| 2005/0204318 A1 | 9/2005 | Tadanza | |
| 2007/0050745 A1* | 3/2007 | Dinter | G06F 30/3312 716/114 |
| 2013/0346931 A1* | 12/2013 | Murakawa | G06F 30/00 716/108 |
| 2014/0282308 A1 | 9/2014 | Chen | |
| 2014/0304670 A1 | 10/2014 | Su | |
| 2015/0331981 A1 | 11/2015 | Mulvaney | |
| 2016/0079994 A1 | 3/2016 | Lee | |
| 2016/0125115 A1 | 5/2016 | Strang | |
| 2018/0068036 A1 | 3/2018 | Oriordan | |
| 2019/0034574 A1 | 1/2019 | Zhu | |
| 2019/0220552 A1 | 7/2019 | Koranne | |

OTHER PUBLICATIONS

D. Deschacht, "Optimum repeater insertion to minimize the propagation delay into 32nm RLC interconnect," 2011 EEE Electrical Design of Advanced Packaging and Systems Symposium (EDAPS), Hanzhou, 2011, pp. 1-4.
Sachin S. Sapatnekar, "Timing." Kluwer 2004, ISBN 978-1-4020-7671-8, pp. I-IX, 1-294.
Ban S. Kourtev and Eby S. Friedman, Timing Optimization Through Clock Skew Scheduling, Kluwer, Mar. 31, 2000, 194 pages.
J. Bhasker and R. Chaha, "Static Timing Analysis for Nanometer Designs A Practical Approach," Apr. 2009, Springer, 587 pages.
SS Sapatnekar, 'RC Interconnect Optimization under the Elmore Delay Model, IEEE31st Design Automation Conference, Jun. 6, 1994, PP387-391.
Maheshwar, Naresh, Sapatnekar, S. Timing Analysis and Optimization of Sequential Circuits, Isbn 978-1-4615-5637-4 E Book, Springer, 1999,201 pages.
"Sensitivity analysis in linear systems", A. Deif, Springer-Verlag, 1986, 234 pages.
"Circuit Sensitivity to Interconnect Variation", Z. Lin, C. J. Spanos, L. S. Milor, and Y. T. Lin, IEE Transactions on Semiconductor Manufacturing, v 11. No. 4, Nov. 1998, pp. 557-568.
"Minimizing Component-Variation Sensitivity in Single Op Amp Filters", Application Note 738, Maxim Integrated, Jul. 22, 2002, 18 pages.
"On the analysis of sensitivity to parasitic effects", G.S.Moschytz, IEE Journal on Electronic Circuits and Systems, vol. 3, No. 5, Sep. 1979, pp. 233-239.
"Large Change Response Sensitivity of Linear Networks", Haley, IEEE Transactions on Circuits and Systems, vol. 27, No. 4, Apr. 1980, pp. 305-310.
"The Generalized Adjoint Network and Network Sensitivities", S. Director and R. Rohrer, IEEE Transactions on Circuit Theory, vol. 16, No. 3, Aug. 1969, pp. 318-323.
"Incremental Versus Adjoint Models for Network Sensitivity Analysis", L. Vallese, IEEE Transactions on Circuits and Systems, vol. 21, No. 1, Jan. 1974, pp. 46-49.
"Computation of Sensitivities for Noncommensurate Networks", J. Bandler and R. Seviora, IEEE Transactions on Circuit Theory, vol. 18, No. 1, Jan. 1971, pp. 174-178.
"Sensitivity assessment of parasitic effects in second-order active-filter configurations", J.K. Fidler, IEE Journal on Electronic Circuits and Systems, vol. 2 , No. 6, Nov. 1978, pp. 181-185.

"Sensitivity: Old Questions, Some New Answers ", S. R. Parker, IEEE Transactions on Circuit Theory, vol. 18, No. 1, Jan. 1971, pp. 27-35.
M. J. McNutt, S. LeMarquis and J. L. Dunkley, "Systematic capacitance matching errors and corrective layout procedures," IEEE Journal of Solid-State Circuits, vol. 29, No. 5, May 1994, pp. 611-616.
"A fully differential layout placement paradox: Matching vs. full symmetry," H. Binici and J. Kostamovaara, 2008 15th EEE International Conference on Electronics, Circuits and Systems, St. Julien's, Apr. 2008, pp. 344-347.
"Experimental investigation of the minimum signal for reliable operation of DRAM sense amplifiers," H. Geib, W. Weber, E Wohirab and L Risch, IEEE Journal of Solid-State Circuits, vol. 27, No. 7, pp. 1028-1035, Jul. 1992.
"Mismatch sensitivity of a simultaneously latched CMOS sense amplifier," R. Sarpeshkar, J. L. Wyatt, N. C. Lu and P. D. Gerber, IEEE Journal of Solid-State Circuits, vol. 26, No. 10, pp. 1413-1422, Oct. 1991.
"A Self-Biased Charge-Transfer Sense Amplifier," S. Patil, M. Wieckowski and M. Margala, 2007 IEEE International Symposium on Circuits and Systems, New Orleans, LA, Jul. 2007, pp. 3030-3033.
"Stray-insensitive switched-capacitor sample-delay-hold buffers for video frequency applications," J. J. F. Rijns and H. Wallinga, Electronics Letters, vol. 27, No. 8, pp. 639-640, Apr. 11, 1991.
"A study of BEOL resistance mismatch in double patterning process," S. Yao, L. Clevenger and N. Zamdmer, 2015 EEE International Interconnect Technology Conference and 2015 IEEE Materials for Advanced Metallization Conference (IITC/MAM), Grenoble, Feb. 2015, pp. 147-150.
"Mismatch characterisation of chip interconnect resistance," J. Deveugele, Libin Yao, M. Steyaert and W. Sansen, Proceedings of the 2005 International Conference on Microelectronic Test Structures, Apr. 2005, pp. 183-186.
"Mismatch and parasitics limits in capacitors-based SAR ADCs," Y. Zhang, E. Bonizzoni and F. Maloberti, 2016 IEEE International Conference on Electronics, Circuits and Systems (ICECS), Monte Carlo, Jun. 2016, pp. 33-36.
"Common-Centroid Capacitor Layout Generation Considering Device Matching and Parasitic Minimization," M. P. Lin, Y. He, V. W. Hsiao, R. Chang and S. Lee, IEEE Transactions on Computer-Aided Design of Integrated Circuits and Systems, vol. 32, No. 7, pp. 991-1002, Jul. 2013.
B. Razavi, "The Current-Steering DAC [A Circuit for All Seasons]," IEEE Solid-State Circuits Magazine, vol. 10, No. 1, pp. 11-15, Jan. 31, 2018.
"Layout of analog and mixed analog-digital circuits," Design of analog-digital VLSI circuits for telecommunications and signal processing, Jan. 1994, Franco Maloberti, pp. 341-367.
"The art of analog layout", A. Hastings, Prentice Hall, 2000, 172 pages.
"Zero-skew-clock algorithms for high performance system on a chip," Yen-Tax Lai, Yung-Chuan Jiang and Cheng-Hsiung Tsai, Proc. 2004 IEEE Asia-Pacific Conference on Circuits and Systems, Tainan, Dec. 6, 2004, pp. 169-172.
"CMOS IC layout", D. Clein, Newnes, 2000,282 pages.
"A 4x Interleaved 10GS/s 8b Time-Domain ADC with 16% Interpolation-Based Inter-Stage Gain Achieving >37.5dB SNDR at 18GHz Input," M. Zhang, Y. Zhu, C. Chan and R. P. Martins, 2020 IEEE International Solid- State Circuits Conference—(ISSCC), San Francisco, CA, USA, Feb. 16, 2020, pp. 252-254.
Wikipedia entry for "repeater insertion," printed from https://en.wikipedia.org/wiki/Repeater_insertion, May 31, 2020, 2 pages.
H. B. Bakoglu, "Circuits, Interconnections and Packaging for VLSI," Addision-Wesley, 1990, index and chapters 5-6, pp i-xiii, 194-279.
J. M. Rabaey, "Digital Integrated Circuits: A Design Perspective, Second Edition, Englewood Cliffs, NJ, Prentice-Hall, Jan. 18, 2002,", chapters 4, 9 and insert A (pp. 133-172, 406-448, and insert pp. 71-76).
X. Nalamalpu ; W. Burleson, "Repeater insertion in deep submicron CMOS: ramp-based analytical model and placement sensi-

(56) References Cited

OTHER PUBLICATIONS tivity analysis," 2000 IEEE International Symposium on Circuits and Systems (ISCAS), May 28, 2000, vol. 3, p. 766-769.
Y. I. Ismail and E. G. Friedman, "Optimum repeater insertion based on a CMOS delay model for on-chip RLC nterconnect," Proceedings Eleventh Annual IEEE International ASIC Conference (Cat. No.98TH8372), Rochester, NY, USA, Sep. 16, 1998, pp. 369-373.
V. Adler and E. G. Friedman, "Uniform repeater insertion in RC trees," in IEEE Transactions on Circuits and Systems I: Fundamental Theory and Applications, vol. 47, No. 10, pp. 1515-1523, Oct. 2000.
M. Ahmed, M. H. Tehranipour, D. Zhou and M. Nourani, "Frequency driven repeater insertion for deep submicron," 2004 IEEE International Symposium on Circuits and Systems (IEEE Cat. No.04CH37512), Vancouver, BC, May 23, 2004, pp. V-181-184.
Yuantao Peng and Xun Liu, "RITC: repeater insertion with timing target compensation," IEEE Computer Society Annual Symposium on VLSI: New Frontiers in VLSI Design (ISVLSI'05), Tampa, FL, May 11, 2005, pp. 299-300.
Y. I. Ismail and E. G. Friedman, "Repeater insertion in RLC lines for minimum propagation delay," 1999 IEEE International Symposium on Circuits and Systems (ISCAS), Orlando, FL, May 30, 1999, pp. 404-407 vol.6.
X. Nalamalpu and W. Burleson, "A practical approach to DSM repeater insertion: satisfying delay constraints while minimizing area and power," Proceedings 14th Annual IEEE International ASIC/SOC Conference (IEEE Cat. No.01TH8558), Arlington, Va, USA, Sep. 12, 2001, pp. 152-156.
R. Venkatesan, J. A. Davis and J. D. Meindl, "Time delay, crosstalk and repeater insertion models for high performance SoC's," 15th Annual IEEE International ASIC/SOC Conference, Rochester, Ny, USA, Sep. 25, 2002, pp. 404-408.
V. Adler and E. G. Friedman, "Repeater insertion to reduce delay and power in RC tree structures," Conference Record of the Thirty-First Asilomar Conference on Signals, Systems and Computers (Cat. No.97CB36136), Pacific Grove, Ca, USA, Nov. 2, 1997, pp. 749-752.
Yuantao Peng and Xun Liu, "Low-power repeater insertion with both delay and slew rate constraints," 2006 43rd ACM/EEE Design Automation Conference, San Francisco, CA, Jul. 24, 2006, pp. 302-307.
K. Banerjee and A. Mehrotra, "A power-optimal repeater insertion methodology for global interconnects in nanometer designs,"in IEEE Transactions on Electron Devices, vol. 49, No. 11, pp. 2001-2007, Nov. 2002.
M. Nekili and Y.Savaria., "Optimal Methods of driving interconnections, in VLSI Circuits," Proc.IEEE Int. Symp. Circuits and Systems, May 10, 1992, pp. 21-23.
V. Adler and E. G. Friedman, "Repeater design to reduce delay and power in resistive interconnect," in IEEE Transactions on Circuits and Systems II: Analog and Digital Signal Processing, vol. 45, No. 5, pp. 607-616, May 1998.
Y. I. Ismail, E. G. Friedman and J. L. Neves, "Optimizing RLC tree delays by employing repeater insertion," Twelfth Annual IEEE International ASIC/SOC Conference (Cat. No.99TH8454), Washington, Dc, USA, Sep. 18, 1999, op. 14-18.
J. Lillis and Chung-Kuan Cheng, "Timing Optimization For Multisource Nets: Characterization And Optimal Repeater nsertion," Proceedings of the 34th Design Automation Conference, Anaheim, Ca, USA, Jun. 9, 1997, pp. 214-219.
C. N. Sze, C. J. Alpert, J. Hu and W. Shi, "Path-Based Buffer Insertion," in IEEE Transactions on Computer-Aided Design of Integrated Circuits and Systems, vol. 26, No. 7, pp. 1346-1355, Jul. 2007.
L. van Ginneken, "Buffer placement in distributed rc-tree networks for minimalelmore delay," in Proc. International Symposium on Circuits and Systems, May 1, 1990, pp. 865-868.
Weiping Shi and Zhuo Li, "A fast algorithm for optimal buffer insertion," in IEEE Transactions on Computer-Aided Design of Integrated Circuits and Systems, vol. 24, No. 6, pp. 879-891, Jun. 2005.
C. J. Alpert and A. Devgan,"Wire segmenting for improved buffer insertion," in Proc. ACM/IEEE Design Automation Conf., 1997, pp. 588-593.
G. Wu and C. Chu, "Simultaneous slack matching, gate sizing and repeater insertion for asynchronous circuits," 2016 Design, Automation & Test in Europe Conference & Exhibition (DATE), Dresden, Mar. 14, 2016, pp. 1042-1047.
N. Zhao, P. Liu, H. Yu, Y. Hu, G. Wang and M. Swaminathan, "Repeater Insertion to Reduce Delay and Power in Copper and Carbon Nanotube-Based Nanointerconnects," in IEEE Access, vol. 7, p. 13622-13633, Jan. 21, 2019.

\* cited by examiner

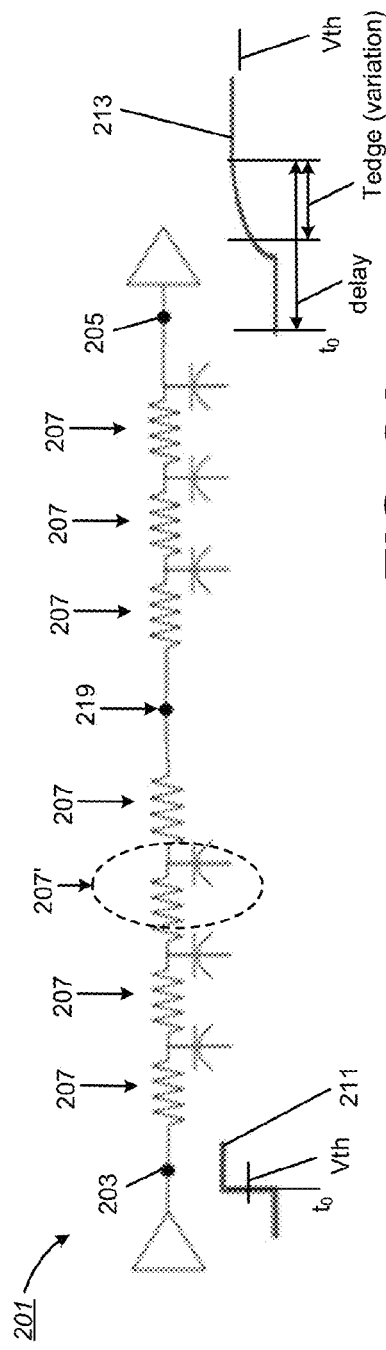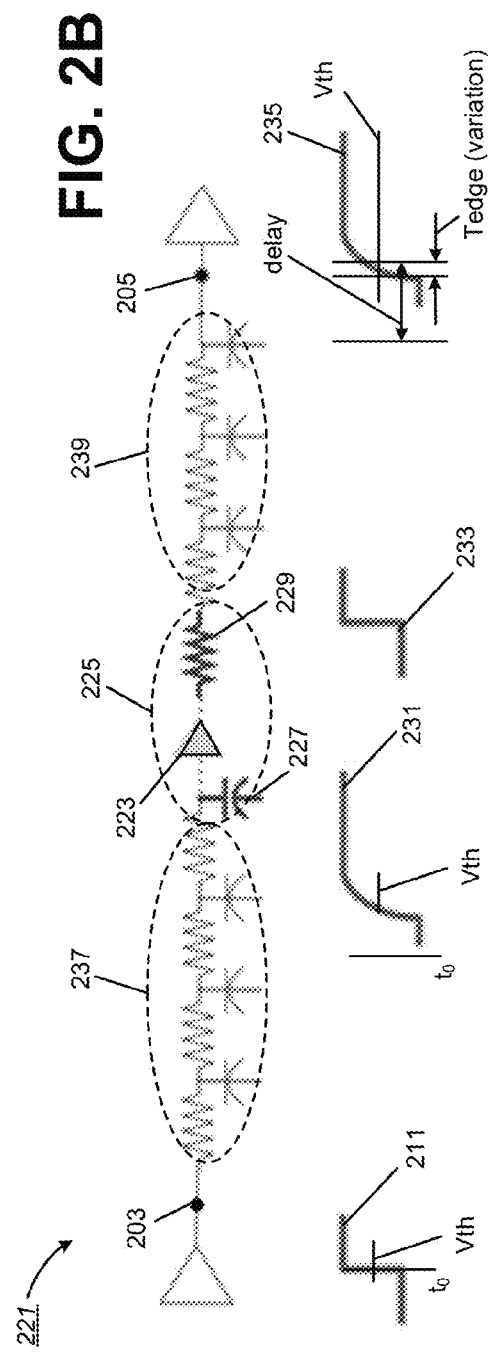

VIRTUAL REPEATER INSERTION

CROSS-REFERENCES

This disclosure claims the benefit of U.S. Provisional Patent Application No. 62/780,863, filed on Dec. 17, 2018, on behalf of first-named inventor Maxim Ershov for "Virtual Repeater Insertion." The aforementioned patent application is hereby incorporated by reference. This disclosure also incorporates by reference U.S. Utility patent application Ser. No. 16/429,007, filed on Jun. 2, 2019, on behalf of first-named inventor Maxim Ershov for "Circuit design/layout assistance based on sensitivities to parasitics" and U.S. Utility patent application Ser. No. 16/434,454, filed on Jun. 7, 2019, on behalf of first-named inventor Maxim Ershov for "Matched net and design analysis based on parasitics."

BACKGROUND

In the field of integrated circuit ("IC") design, it is typically desired to simulate new integration designs in order to assess whether those layouts will perform to expectations (an "integration design," as used herein refers to a design for an IC or any layout of any circuitry is intended to be part of an IC design). Design features such as path length, components traversed or encountered, material structures (and discontinuities in those structures) and nearby circuitry elements and signal paths, and their associated resistances and capacitances, can all affect the extent to which a propagating signal is delayed and/or deteriorates in route to an intended destination. The mentioned design features and their associated parasitics can create many different types of effects including time delays, unintended signal attenuation, low slew rate in rising and/or falling edges (or other undesired changes in pulse shape), near-end or far end crosstalk, signal reflections, and other types of effects; sometimes, these effects can be severe enough that the circuit design experiences errors, either all the time or for "worst case" patterns or conditions. Simulation protocols can examine the behavior of one or more test signals as they travel on each pathway of an IC design (e.g., by modeling how a signal such as a rising or falling waveform, a "unit pulse" or a more complex signal, travels down that pathway, and whether it is sufficiently recognizable and/or timely at the intended destination to perform the signal's intended function).

When problems are discovered, designers sometimes insert repeaters to repeat (e.g., reconstitute a transmitted signal) at interim points along the transmitted signal's path. A "repeater" as used herein is any circuit element that retransmits, corrects or boosts a signal; it can include without limitation digital buffers, transceivers, inverters, drivers, flip-flops, amplifiers and other types of circuit elements. For example, for a uniform transmission pathway, the delay along half of the length of the length of the pathway typically only accounts for one quarter of the overall delay/deterioration, since capacitance and resistance are in theory each reduced by half; as this example demonstrates, one or more repeaters, inserted at suitable locations, can therefore substantially ameliorate characteristics that cause delays/deterioration. However, repeaters can also themselves add capacitance, resistance and some intrinsic delay to a given pathway and therefore repeaters do not necessarily improve signal characteristics unless inserted judiciously.

To effectuate repeater insertion, designers typically estimate a location where a repeater should be placed and generate a new circuit design; this design is then laid out and is subjected to design rule checking ("DRC") and layout versus schematic ("LVS") software tools; each design is then extracted, with the post-layout netlist being provided to software-based circuit simulators. This process must typically be reperformed many times, i.e., estimated locations are frequently inaccurate, because the design features in question (and their associated parasitics) can in practice be highly complex and non-uniform, and optimum repeater design and positioning is not necessarily intuitive. Each design iteration, including layout and associated simulation, is typically very time-consuming, and adjustments must often be reperformed iteratively using trial and error until a suitable solution is found. When it is considered that some transmission paths do not require repeater insertion, while others might require one, two or a greater number of repeaters, and that a complex circuit design can potentially require that thousands of pathways be examined, it can be appreciated that repeater insertion is a daunting task.

What are needed are techniques for addressing these difficulties, that is, for improvements in circuit design tools (e.g., circuit simulators and/or layout editors) and related methods which facilitate optimal repeater insertion, and which generally provide for a more efficient design generation. The present invention satisfies these needs and provides further, related advantages.

BRIEF DESCRIPTION OF THE DRAWINGS

The patent or application file contains at least one drawing executed in color. Copies of this patent or patent application publication with color drawing(s) will be provided by the US Patent and Trademark Office upon request and payment of the necessary fee.

FIG. 2A is an illustrative figure showing a hypothetical circuit path which extends from node 203 to node 205.

FIG. 2B is an illustrative figure showing virtual insertion of a repeater in the hypothetical circuit path from FIG. 2A, and associated signaling impact.

Figure 1:
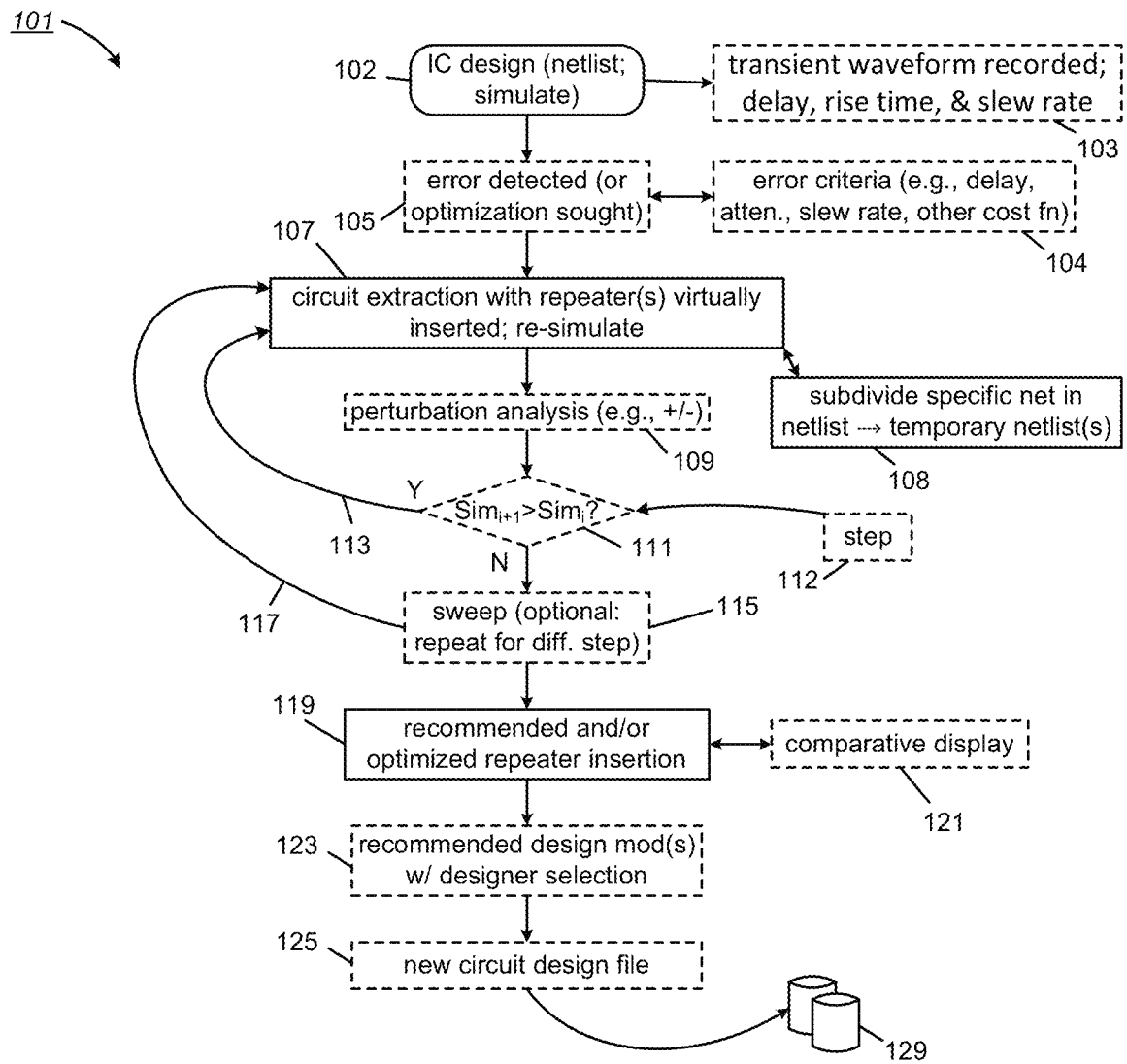
FIG. 1 is a block diagram showing one embodiment of techniques for virtual repeater insertion.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques that can be used to improve the functioning of electronic design automation, analysis and/or layout tools, and to speed up the development of an integrated circuit design. The various techniques can be embodied as software, in the form of a computer, device, service, cloud service, system or other device or apparatus, in the form of a circuit design or integrated circuit layout or a netlist file produced or modified as a result of these techniques, or in another manner. While specific examples are presented, the principles described herein may also be applied to other methods, devices and systems as well.

DETAILED DESCRIPTION

This disclosure provides techniques for addressing the aforementioned problems by virtually inserting a repeater using a post-layout netlist (PLN) representation of an electronic circuit, by providing for adjustment of that virtual repeater, as appropriate, and by generating a modified circuit design/layout once suitable repeater specifics are identified. In one embodiment, these techniques are embodied as software (processor-instructions carried by non-transitory storage media) that, when executed, will assist a user in designing an integrated circuit and/or simulating integrated circuit performance.

In an optional feature associated with these techniques, parasitic elements, such as resistances, capacitances and other forms of parasitic elements, can be used to examine non-uniformities of a circuit path, permitting automated selection of an initial repeater insertion point at a near-optimal position within the PLN representation. To understand why an insertion point is not necessarily intuitive, it is again noted for example that assuming uniform parasitics and other non-real-world conditions, halving path length in theory reduces RC delay by ¾ (i.e., given that each of resistance and capacitance is theoretically reduced by half under these circumstances); based on this observation, it might be naively assumed that a repeater should always be positioned at a readily-deduced fractional point along a path's length, e.g., such as at the path's halfway point, for example. However, as noted earlier, conditions are often non-uniform; a path's halfway point for example might not be the best position in which to place a repeater, and it might also coincide with a non-modifiable object, e.g., a via that cannot be moved or interrupted. Using detailed netlist expressions where individual circuit paths, vias, junctions and other elements are represented by their parasitics, software scripted in accordance with the techniques disclosed herein is able to identify non-uniformities and specific points/nodes that represent advantageous initial repeater insertion points, for example, at nodes more closely representing a specific delay (e.g., the true halfway point from a parasitics' perspective). Naturally, the techniques and structures disclosed herein provide for extension of these principles to any desired performance metric (e.g., positioning one or more repeaters at suitable positions to maximize voltage or timing margin at a destination node, and so forth). An optional feature associated with the techniques presented by this disclosure calculates signal impact directly using a post-layout netlist (PLN) file for a given integrated circuit (IC) design, and then modifies that PLN file as necessarily to simulate insertion of one or more "virtual repeaters;" because this insertion is "virtual," design variables such as precise insertion position may be quickly modified and re-simulated to identify optimal parameters, all optionally before generating an actual circuit design. A modified PLN file for example provides for ready visualization of circuit parameters and/or virtually-modified designs, while permitting the user to dynamically adjust insertion points, repeater particulars (e.g., repeater cell selection) and other parameters, to fine-tune desired performance, all without requiring the time-consuming steps referenced earlier. Aided by optional techniques disclosed herein that binarize the PLN file (and thereby enable speedy retrieval and/or modification of small segments of a PLN file), the techniques disclosed herein collectively help speed the design process, both simplifying the process of selecting and vetting a suitable repeater-based design, and moving much of that process to a dynamic, fast process that permits variation of repeater design and ready comparison and selection between design alternatives, all without requiring that one first design and then layout and extract a new integrated circuit design.

Note that standardized expressions exist for a post-layout netlist, including without limitation the Standard Parasitic Format (SPF), the Detailed Standard Parasitic Format (DSPF), the Standard Parasitic Exchange Format (SPEF), Open Access Extracted View (OAEV), Caliber View, SPICE netlist, and other formats. In one embodiment, parasitic elements are broken down to as fine a granularity as possible, and to this end, a DSPF format can be advantageously used (or generated if not readily available); however, it is also possible to apply techniques disclosed herein to other parasitic expression formats including without limitation any of those referenced above. Digital values provided by these formats can represent one or more conventional types of parasitic elements including by way of example, resistances, capacitances, and inductances (mutual- or self-inductances) expressed in some unit of measure; in some implementations, the parasitic elements can be of mixed types. Note that the expressed parasitic elements ("parasitics") are typically derived from a parasitic extraction, i.e., they include values representing the materials, dielectrics, coupling capacitances and other values that arise from the relative positioning and organization of structures in the integration design (i.e., design of an integrated circuit or "IC," or any part thereof), and are typically not derivable simply from a general circuit schematic. The disclosed techniques can operate on these parasitic elements by determining how these things affect parameters such as RC delay, attenuation and slew rate (e.g., edge rising and falling times), enabling for example fast, automated detection of problem paths (bottlenecks) in a given integration design, and precise selection of suitable points for virtual repeater insertion along those problem paths, again on an automated basis that can take into account non-uniformities. The disclosed techniques can also be combined with the techniques described in our incorporated-by-reference patent applications, including by way of example, techniques that permit dynamic modification of structural elements (e.g., pathway sizing or routing, interface design and so forth) based on sensitivity of various circuit performance characteristics to individual or lumped parasitics, thereby providing a designer with a wide-range of tools to interactively (and virtually) modify circuit structures in order to achieve desired performance goals; elaborating, software using techniques discussed in this document and the incorporated-by-reference documents can identify bottlenecks, can explore dynamic structure modification to attempt to alleviate those bottlenecks (e.g., based on sensitivity analysis as discussed in our copending applications), and can insert repeaters at suitable positions where structural modification does not adequately eliminate the identified bottleneck. Circuit elements being added to actual design only after initial qualification and vetting (e.g., based on "virtual analysis" rooted in a modified netlist). Briefly citing an example of this, if RC delay is greater than expected, or if slew rate and/or edge rise or fall times for a given circuit path are other than as expected, for example, due to cross-coupling between adjacent circuit paths, it may be that the problem can be resolved through either or both of path rerouting (e.g., to reduce sensitivity of the given circuit path to a parasitic representing the cross-coupling), or insertion of a repeater at a suitable point, or both; a circuit designer presented with tools that help visualize change in performance characteristics as structures are virtually and dynamically modified, resized or rerouted, and as repeaters are virtually inserted and/or moved, facilitates a more efficient, faster design process, with alternatives being quickly vetted by the designer.

In one embodiment, the techniques disclosed herein can be embodied as an improvement to a computer-based electronic circuit analysis tool. Such a tool first identifies a PLN file representing a circuit of interest, for example, by retrieving a designer-specified PLN file or by extracting a given integration design. If the PLN file does not have parasitics' data, or conversely, does not have parasitics expressed at a sufficient level of granularity, in one embodiment, these (detailed) parasitics can then be computed using an extraction tool. Such a file, depending on format and underlying IC design, can potentially be of enormous size, and optionally, the software tool binarizes this file and indexes points in the binary file where pertinent nets can be selectively extracted, modified and reinserted into the binary file, facilitating local-memory-based fast operations (e.g., using a laptop or conventional workstation). One or more pathways of interest are then identified within the design, e.g., based on designer-specification, or in one embodiment, based on automated error identification, performed using the PLN representation. Such a process flags circuit pathways which violate designer specified criteria (for example, and without limitation, based on criteria for slew rate, edge rise or fall times, attenuation, inadequate voltage or timing margins, RC delay, parasitics such as resistances or capacitances or combinations of these things). In one implementation, these errors can be identified by modeling a test signal such as a step function (e.g., rising edge or falling edge), a unit pulse, or a more sophisticated signal (e.g., representing three or more edges), or in some other manner. The software tool can then automatically select one or more insertion points for repeaters selected from one or more standard cell alternatives, and can display both a table-based or graphical rendering of a proposed design modification, optionally providing the designer with an ability to fine tune or change repeater structures and/or structural configurations (i.e., and associated parasitics), modify insertion points, and/or take other actions; the software employs the techniques introduced above, for example, by automatically splitting a net of interest from the netlist representation and operating on the temporary upstream and downstream nets obtained (and/or modified) as part of this process. The circuit designer for example can be provided with a colorized display or rendering which dynamically reflects improvements, for example, displaying parameters and/or graphical structure representations in red (e.g., for continuing errors/issues) and in green (e.g., for structures where associated circuit characteristics—given associated parasitics—are within desired norms), thereby facilitating a dynamic, intuitive design process where the designer adjusts parameters (e.g., insertion points, repeater size, path width, via location and so forth) and in real-time visualizes improvements to and/or degeneration of circuit characteristics of interest. Any structural modifications/changes can then be used to create a new PLN file (e.g., DSPF file), which can then be used for simulation and design verification as desired, with changes to the underlying circuit optionally only then being carried over to an actual circuit design.

For embodiments where errors are detected or flagged automatically based on coded or designer-specified parameters, nearly any desired criteria can be used to identify errors. For example, it might be that the software tool is configured to automatically validate an associated integration design (and to display a result indicating successful validation), provided that all of the following criteria are satisfied:

slew rate at a destination point representing a given receiver, relative to an upstream driver or transmitter, at an "edge crossing," is represented by an edge slope value that is no less steep than a specified threshold (e.g., a designer-specified critical value, expressed as a change in volts per unit of time);

voltage margin at the receiver, relative to a threshold, is no less than specified value (e.g., 1.5 times a decision threshold); and RC delay from at a destination point, relative to a unit pulse at a receiver is no greater than some threshold (e.g., a fixed time value, or a certain percentage of a system clock period, or within a certain difference tolerance relative to a matched pathway).

Naturally, these examples introduce a simple hypothetical set of error criteria for purposes of narration, but as should be apparent, a designer and/or design tool can predicate automated or assisted validation on any number of desired criteria with any desired, respective thresholds, and can also express criteria in any desired method (e.g., pulse spreading is no greater than 10% for example, as an alternative manifestation of skew). In a contemplated implementation, the tool is configured to provide or suggest one or more pareto optimal solutions (i.e., which satisfy many design criteria simultaneously), with repeaters inserted in one or more pathways as appropriate, and with a designer selecting suggested solutions using the tool, and with the tool then automatically triggering re-extraction and/or update of a design file stored in non-transitory storage so as to commit the design modification to the given integration design. In an alternate embodiment, a designer initially dead-reckons repeater insertion, with software assisting visualization of modification and improvements rooted in the techniques disclosed herein. Clearly, many possible implementations will occur to a skilled EDA designer and/or software architect. As should be apparent from the foregoing, apparatuses and methods which embody the techniques described in this disclosure can provide a powerful tool for analysis and debugging of IC designs, and can greatly streamline the process of dealing with unanticipated bottlenecks.

Note that several specific terms used herein should be further introduced. First, "circuits" and/or "circuitry" can refer to analog or digital electronic elements (e.g., dedicated logic gates), either arranged as special purpose circuitry that necessarily performs a certain function when electrically motivated, or as general purpose circuitry (e.g., a processor) that is controlled or otherwise configured by instructions (software) so as to adapt that circuitry to perform a specific function and cause that circuitry to operate as though it was special purpose circuitry. "Processor" as used herein refers to a set of configurable hardware circuit elements or hardware circuit elements that can be controlled to perform any one of a number of different functions including, without limitation, an FPGA, microprocessor, microcontroller, whether or not embodied in a standalone die or as a discrete integrated circuit. "Instructions" and "software" typically refer to instructional logic for configuring and/or controlling operation of a processor. Such instructions are typically written or designed in a manner that has certain architectural features such that, when those instructions are ultimately executed, they cause the one or more general purpose circuits or hardware devices (e.g., one or more processors) to necessarily perform certain described tasks. "Logic" can refer to software logic (i.e., instructional logic) or hardware logic (e.g., a digital chip or board design) or a combination of these things. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine (such as one or more processors). The machine-readable media can be in standalone form (e.g., a program disk, solid state memory card, whether bootable or executable or otherwise, or in other memory) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, "instructions stored on non-transitory machine-readable media" typically refers to software stored on disk or in other physical memory or storage, where the software is structured such that when it is later (ultimately) installed or executed by an operator or end user, it configures a machine (e.g., one or more processors or other forms of circuitry) so that they operate in a prescribed manner. In one implementation, instructions on non-transitory machine-readable media can be executed by a single computer or processor and, in other cases as stated, can be stored and/or executed on a distributed basis, e.g., using one or more servers, clients, or application-specific devices, whether collocated or remote from each other. Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices, or in the form of dedicated circuitry or circuitry combined with such software. Throughout this disclosure, various processes will be described, any of which can generally be implemented as instructional logic (e.g., as instructions stored on non-transitory machine-readable media), as hardware logic, or as a combination of these things, depending on embodiment or specific design. A circuit design, or schematic, as used herein generally refers to a generalized description of how component structures in an electronic circuit should be connected together. In the process of circuit design, a schematic is then laid out in a manner such that two-dimensional (2D) pathways are geometrically positioned relative to one-another. A circuit description is then extracted as a netlist which takes into account precise materials, dielectrics, 3D dimensioning, and other factors, and models the entire circuit design as a netlist, i.e., a list of connected nets. A "net" is simply a set of electrically-connected structures, and a netlist is a list that lists the various nets and devices of an electronic circuit and describes how they are connected. Some, but not all netlist formats, will contain a description of parasitic elements created by the particular design, e.g., given characteristics of the various metal layers, vias, dielectrics and device instances that make up a particular design. An "integration" or "integration design" as used herein typically refers to a portion of a layout for an integrated circuit (IC) design, e.g., it can be a large or small portion of the entire design (e.g., potentially the entire design). A "node" as used herein refers to any type of specified "point" in a circuit design (e.g., whether or not such serves as a junction between two elements or signal paths). A "structural element" as used herein refers to any physical structure or hierarchy of physical structures in a given circuit design, for example, an individual parasitic (e.g., that might be expressed as an incremental resistance for just a small part of a circuit trace), a group of parasitic elements (e.g., lumped RC effects attributable to a given polygon or layer), or indeed, any part of a circuit design (e.g., a via, a layer, a group of layers, and so forth). "Asymmetric" or "asymmetry" as used herein means that supposedly-matched objects exhibit operating characteristics that do not correspond to each other as intended, while "reciprocal" objects are objects that are intended to have some type of predetermined relationship that interrelates one or more of their operating parameters. "Module" as used herein refers to a structure dedicated to a specific function; for example, a "first module" to perform a first specific function and a "second module" to perform a second specific function, when used in the context of instructions (e.g., computer code), refer to mutually-exclusive code sets; these code sets can be embodied as different code portions (e.g., different sets of lines in a common-program) or respective standalone routines, programs or files. When used in the context of mechanical or electromechanical structures (e.g., a "sensor module"), the term module can refer to a dedicated set of components which might include hardware as well as software); for example, an "encryption module" and a "network registration module" would refer to dedicated, mutually exclusive components for performing tasks of encryption and network registration, respectively, and they might be discrete code sets or have discrete mechanical structures, or both, depending on context. In all cases, the term "module" is used to refer to a specific structure for performing a function or operation that would be understood by one of ordinary skill in the art to which the subject matter pertains as a conventional structure used in the specific art (e.g., as a software module or hardware module as those terms would be understood in the context of computer and/or software engineering and/or circuit integration), and not as a generic placeholder or "means" for "any structure whatsoever" (e.g., "a team of oxen") for performing a recited function (e.g., "encryption of a signal"). "Electronic" when used to refer to a method of communication can also include audible, optical or other communication functions, e.g., in one embodiment, electronic transmission can encompass optical transmission of information (e.g., via an imaged, 2D bar code), which is digitized by a camera or sensor array, converted to an electronic digital signal, and then exchanged electronically. Generally speaking, reference will be made herein to instructions such as computer code which, "when executed," cause one or more processors to perform a specific task; this usage should be interpreted as referring to the intended design and operation of software (e.g., such as might, following software sale and/or distribution, be installed and executed by a software licensee or an end-user).

With various system elements thus introduced, this description will now proceed to describe the various figures ("FIGS.") and provide additional detail concerning various specific embodiments. Generally speaking, it is specifically intended that any of the cited structures, operations, algorithms, features, use models, applications or operands ("elements") can be mixed and matched, and included or omitted in any combination or permutation as desired or as pertinent to the particular application; that is to say, while several specific detailed examples discussed herein feature specific combinations of certain elements, it is generally contemplated that inclusion of any these elements are optional relative to one another and that these elements can be combined in any manner suitable or appropriate to a specific design.

FIG. 1 is a block diagram showing one embodiment 101 of techniques for virtual repeater insertion. The techniques are performed with respect to an electronic file 102 representing a given integration design (e.g., part of a specific layout for an integrated circuit). The layout file typically represents not just a circuit schematic, representing component level interaction, but contains information regarding path routing, widths, lengths, device interconnections and other particulars representing how the specific circuitry will be arranged. In one embodiment, the techniques 101 are bundled with computer-aided design or electronic design automation software that operates on, or helps produce such a design file 102. In a different embodiment, the techniques 101 are implemented on a standalone basis, such that an electronic design file 102 has been previously-generated and stored, and is received as an input. It is also possible for the techniques are bundled with some other type of software tool. As indicated by numeral 102, the specific integration design is simulated, either as part of the depicted method, or for example, by an independent simulator and, as part of this process, circuit characteristics (i.e., characteristics of specific pathways) are simulated and recorded.

As implied by numeral 102, in one embodiment, this simulation is performed on the basis of a post-layout netlist (PLN) file, that is, a file representing extracted non-ideal circuit behavior arising from the specific IC design that contains information representing parasitic elements, for example, unintended path resistances, stray capacitances, inductance and so forth. If the electronic design file 102 as provided does not contain information about these parasitics, then the file is extracted so as to generate parasitic elements. In various embodiments, a post-layout netlist can be expressed in a standard form, including without limitation in the Standard Parasitic Format (SPF), the Detailed Standard Parasitic Format (DSPF), the Standard Parasitic Exchange Format (SPEF), Open Access (OA) extracted view, SPICE netlist, and/or other formats. Advantageously, parasitic elements are broken down to as fine a granularity as possible, and to this end, a DSPF format can be advantageously used (or generated if not readily available). Note that "parasitics" as used herein encompasses impedances such as resistances, capacitances, inductances, and other forms or expressions for these things, whether or not all of these things are present together (e.g., it is possible to operate on a parasitics file representing just resistances or just capacitances, for example). Using this information, the techniques 101 are then applied to model non-ideal behaviors, for example, degeneration of transient waveforms, parasitic-influenced delay times, pulse rise and fall times, edge slew rates and other effects. In one embodiment, the techniques are applied to model treatment of a square wave digital pulse (e.g., a step function, such as a rising edge only, falling edge only, or both), a series of multiple pulses (e.g., representing a bit pattern) a more complex digital waveform, or even an analog waveform (e.g., a sine pulse). Taking an initial example of a rising edge step function—an example that will be used in more detailed discussions below—the techniques 101 model such as a waveform which arises at a node (e.g., at the output of a transmitter or driver), which then travels through various routing (each modeled as one or more parasitics) and which then arrives at a destination node (e.g., a receiver, circuit element, sampler, etc.) in delayed and altered form; note that the use of a transmitter/receiver combination although used repeatedly in this disclosure is not required, and that it is possible for example to model waveform behavior (e.g., degradation) between any two nodes in a signaling system. As the waveform passes along a pathway, it encounters the parasitics, e.g., unintended resistances, capacitances, inductances and other elements, and these parasitic elements then influence the waveform by attenuating, delaying, or otherwise changing the waveform (e.g., changing edge slew rate), or imparting other effects.

To facilitate qualification of and adjustment of the IC design, the techniques 101 are applied to model signal transmission characteristics based on the PLN file, and to help a designer determine/evaluate whether those parasitics will cause transmitted signals to be unsuitable for their intended purpose. In one embodiment, the results of simulation (e.g., simulated delay or edge slew rate) are automatically applied against designer-provided criteria to detect performance issues. Note that in a typical design, there may be many thousands, millions, or more paths that should be evaluated to verify proper performance of the given integration design. The electronic design file 102 (and more particularly, the parasitics file) can be many gigabytes in size and this may in turn greatly exacerbate the challenges associated with design verification. This potential issue, and optional techniques that improve the ability of conventional networks, servers, computers and storage systems to efficiently process these massive files on a timely basis, will be discussed further below. For the present, it should be understood that one or more individual paths (e.g., transmission paths) of a given design are simulated based on the PLN file, to determine whether signals traveling on those paths can still function acceptably.

In one embodiment, the designer or software specifies criteria 104 that will be used to screen whether signal paths perform acceptably, referred to herein as "error criteria;" nearly any desired method can be used for specifying and/or evaluating whether the parasitics associated with a given path are such that associated signals will perform acceptably. For example, in one embodiment, a designer can specify one or more primary metrics used to identify unacceptable performance, and one or more secondary metrics used to identify marginal but still acceptable performance (e.g., with the latter triggering an optional optimization process). For example, error criteria can be configured so as to permit software to compare, and immediately detect, based on the stored simulation measurements of pathwise-RC delay, edge slew rate and attenuation, whether signals on a given path will perform acceptably. A designer might choose to specify for a given design that no edge should have a slope that is less than a critical value (e.g., X Volts/microsecond) at an expected edge crossing time, and similarly maximum voltage should be no less than 1.5× a decision threshold, that minimum voltage should be no greater than ⅔ the decision threshold, that attenuation should be no more than 20%, that aggregate RC delay from transmitter to receiver should be no less than X picoseconds, and so forth; naturally, these examples are simply hypothetical examples, and many more possible evaluation criteria and associated thresholds will occur to those having ordinary skill in the art. As an example of a relative threshold, a designer might specify that signal traces of a parallel bus should have RC delay that is within +/−25% of average RC delay for all lines of the bus, with this again being a nonlimiting example only. A designer might choose to specify multiple thresholds, e.g., with potential failure being judged based on a first metric (e.g., edge slew rate results in slope less than a designer specified criterion) and marginal performance signaled based on a second criteria (e.g., edge slew rate has a slope less than a designer-specified critical value but still greater than a second threshold which represents desired norms). Nearly any type of desired criteria (e.g., each representing a cost function) can be used to evaluate suitability of performance of the given design; in one embodiment, more complex Boolean logic can also be used to evaluate performance, e.g., based on conjunctives, disjunctives, and relatively complex logic rules; for example, a designer might specify that performance should be flagged if there is very low edge slew rate at a destination node (e.g., slope less than X volts/microsecond at edge crossing), but only if maximum voltage margin at this same node (e.g., at data eye midpoint) is less than 1.5 times the voltage used for a decision threshold. Once again, these examples are illustrative and hypothetical only, and will depend to large extend on the designer and the particular circuit being evaluated. In one implementation, the techniques (101) are embodied in software which is configured to accept as a user-setting a configuration file having one or more predefined sets of error criteria, optionally in a manner separately established for the circuit-type or path-type being evaluated.

As indicated by numeral 105, the techniques of this embodiment then proceed to analyze the various signaling paths in the given design, automatically detecting errors based on the provided error criteria. For paths which are determined to represent an error or for which optimization is otherwise sought (e.g., performance is acceptable but marginal), per numeral 107, the techniques then evaluate whether a repeater should be virtually inserted into the path at issue. Note again that the term "virtually" is used here to denote that a repeater does not at this point exist at a corresponding place in the associated circuit design, but is instead modeled in the form of a mathematical representation of parasitic elements, e.g., as a modification of the netlist (for example, with the repeater modeled as one or more parasitic elements/impedances only); that is, rather than requiring a circuitry or circuit layout modification in advance, and associated rules-checking and extraction, at this point, the techniques (101) operate on the basis of the PLN file, with repeater insertion simply being predicated on a modification of that file. The way this is done in this embodiment is conceptually represented by numeral 108, i.e., a net of interest (e.g., parasitic elements characterizing an interconnection between two nodes in the integration device) is identified and subdivided into two new subnets, one representing a portion of the identified net which is "upstream" of a proposed virtual repeater insertion point (e.g., coupling a presumed transmitter or other source node and the virtually-inserted repeater) and one representing a portion of the identified net which is downstream of the virtual repeater insertion point (e.g., coupling a second node such as a receiver with the virtually-inserted repeater). As implied by numeral 107, the software then dynamically then re-simulates the signal path of interest using the PLN file, but this time, using the two "temporary" nets created in connection with the virtual repeater presumed insertion. Where the repeater that would be inserted in the actual circuit design is a buffer for example, it can be modeled as a circuit element that samples a digital value, stores that value and then retransmits that value using a "fresh" square pulse, the presence of the repeater can impart some minor delays, but this may be much more than offset by improvement in overall RC characteristics for the path; for example, as noted earlier, halving path length generally reduces RC delay by ¾, because in theory both parasitic resistance and parasitic capacitance are length-dependent (and thus, halving length in theory can provide a fourfold advantage in reducing RC delay). However, as noted earlier, this assumes ideal path behavior. The described techniques, by operating on parasitics represented by the PLN file, account for non-uniformities arising from the proposed IC design, and are able to precisely place repeaters where they will most be needed, for example, at an exact parasitics'-wise midpoint (or other point) of a pathway (or, e.g., at an adjacent node in the event that such a midpoint coincides with an indivisible circuit element, e.g., a via). Note also that some paths may not require a repeater (e.g., issues can be resolved using other techniques) or conversely, some paths might require more than one repeater. The disclosed techniques therefore in one embodiment advantageously insert one or more repeaters "virtually" into the post-layout extraction netlist, each time (i.e., for each repeater) by dividing a net corresponding to repeater into upstream and downstream portions. As will be explained below, for purposes of repeater insertion, and repeater representation in the PLN file, virtual repeater presence can optionally be modeled as a single load capacitance in the case of the upstream net (i.e., a load capacitance replaces elements of that net which are removed as corresponding to the downstream net), and repeater representation in the netlist is optionally modeled as an output resistance (e.g., driver output resistance) in the downstream net (i.e., replacing elements of that net which are removed as corresponding to the upstream net), with the upstream and downstream nets then independently being re-simulated; in simulating the downstream net, the upstream net will be replaced by an output resistance and will be modeled as a signal source (e.g., representing a "clean pulse" transmitted by the virtually-inserted repeater). As indicated by numeral 108, the result is new temporary PLN data (e.g., an upstream and downstream net, modeled as a replacement for a specific net, e.g., portion, of the original PLN file) which is retained in memory as a temporary working copy. Per numeral 109, perturbation analysis is then optionally performed by software and/or the designer using this temporary working copy. For example, in one embodiment, a user interface may be used to permit a designer to vary repeater cell choice, sizing, position or other parameters, for example, optionally using a "slider," cursor or software button presented on a visual display to change repeater parameters, with software then in real-time visualizing benefits and/or negatives of such variation. In one embodiment, a color based graphical rendering is used such that, as the designer changes repeater particulars, color (referred to sometimes generally as "temperature") is changed to denote marginal improvements/losses in overall signaling characteristics which are attributable to the designer's incremental modification. As implied by decision box 111, the software (and/or the designer) evaluates whether repeater position and/or any modification result in improvements which produce a better modification—if not, per the "no" decision path exiting this box 111, most recent change(s) can be discarded, with software reverting to a prior state, but if change does produce improvement, then per arrow 113, further optimizations can be optionally attempted, with a net of interest once again being subdivided in a manner that corresponds to any change parameters (e.g., load capacitance, drive resistance, node insertion point, and so forth), as appropriate. As represented by function block 112, it is also possible to vary step size or type, e.g., a designer performs modifications at a first level of granularity until no more improvements are to be had, and then reduces to smaller increment (or conversely, a step corresponding to variation of a different design parameter is used) to attempt to obtain further optimizations (or conversely, "step size" is made selective on the part of the designer, such as via a drop-down menu). Per numeral 115, it is also possible to have software sweep from an initial position automatically through a range of variation, optionally for multiple step sizes, each time looping back per arrow 117, until an optimal solution or set of pareto optimal solutions is found.

The result of this processing, for each path where repeater-based improvement is sought, is a recommended and/or optimized repeater insertion point (and optionally, a specific type and/or sizing of repeater), per numeral 119. In one embodiment, as alluded to before, a comparative display can be presented to the designer (i.e., as per numeral 121), to permit the designer to compare and contrast a modified insertion design with the initial design/simulation, or alternatively, to compare and contrast multiple proposed modifications. Such a display can be table-based, with software for example generating a columnar display that presents data for performance characteristics (e.g., delay time, edge slew rate, and so on) for the various alternatives being evaluated. Such a design can also be graphically presented with rendering performed so as to represent temperature; for example, a depiction of a portion of the (unmodified) integrated circuit layout can be presented in a first window, with "red" highlighting used to indicate unacceptable performance, with a matching graphical rendering of the layout as modified with virtual repeater insertion in a manner that shows the virtual repeater insertion point and that uses different shading (e.g., "green") to convey graphically that the repeater insertion now results in a design that satisfies performance constraints. Many different types of shading and displays can be used; for example, if two designs are being evaluated, each can be graphically rendered or otherwise presented in a manner that provides for a meaningful comparative display (e.g., coloring can be relative). Some of these principles will be further discussed below in connection with FIGS. 6A-6F. The designer is then optionally provided with an opportunity to make further modifications and/or to "select" or "commit" modifications per numeral 123, at which point the particulars of the virtual repeater selection and insertion can then be automatically injected by software into a file for the underlying circuit design, per numeral 125. A new design (i.e., an updated electronic file representing a modified design) can then be automatically generated and stored in memory, conceptually represented by database icon 129, for further simulation or other use (e.g., for repeatably manufacturing integrated circuits), as appropriate. Again, with evaluation, variation and relatively "fast" adjustments made based on the PLN file, repeater choice and selection may be evaluated (a) in tandem with structural modification to eliminate design bottlenecks (e.g., as discussed more fully in the incorporated-by-reference documents), (b) in a manner not requiring the time-consuming steps of circuit layout and verification, design-by-design, i.e., circuit design and verification are advantageously performed once repeater and/or other structural modifications have been evaluated for performance.

At this point, a narrative example illustrating the effects of virtual repeater insertion would be helpful. FIG. 2A illustrates a hypothetical signaling path 201 without virtual repeater insertion, while FIG. 2B illustrates virtual repeater insertion into this signaling path, resulting potentially in modified path design 221.

More particularly, a hypothetical signaling path, represented by numeral 201 in FIG. 2A, is seen extending from a first node 203 to a second node 205; the path 201 is modeled as a series of parasitics elements 207, each represented in the PLN file by a resistance and/or capacitance. For example, the path can be represented from a VLSI perspective as a series of 3D structures/polygons, each forming a "net." The PLN file models the path 201 using at least one, and potentially many, parasitics' descriptions, with different current flow options of path 201 each appearing as a separate "net" in the PLN file format. As seen at the left side of the figure, a square pulse having a generally vertical rising edge is designated by reference numeral 211, as it might leave a transmitter (or other node associated with the signaling path). Software embodying techniques introduced above models behavior of this square pulse signal 211 as it progresses down the path. Owing to the parasitics involved, the software models this signal as it arrives at the receiver as distorted in shape, with reduced amplitude; this receive signal is designated in FIG. 2A by numeral 213. The parasitics associated with long path routing in this case delay the signal by a quantity labeled as "delay" at the right side of the FIG.; these parasitics also cause attenuation of the signal relative to a decision threshold $V_{th}$, such that it is not clear at the second, destination node 205 whether the maximum voltage represents a first or a second logic state. Also, the parasitic elements can also cause a low slew rate of the vertical edge of the initial waveform, such that if a logic state transition is in fact detected, unpredictability may exist as to exactly when that transition happens, as represented by the quantity "Tedge (variation)" seen in FIG. 2A. These various effects might result in a signal being unusable for its intended purpose. Thus, as referenced earlier, as desired by the designer or according to the particular application, the values simulated and stored by software are compared against one or more error criteria; software operating in accordance with the techniques disclosed herein then automatically flags the path as one that might benefit from repeater insertion. The error criteria in this case, once again, might represent some combination of one or all of unacceptable signal delay, voltage margin, timing margin, edge slope, or any one of a myriad of other criteria, as might be important to a particular application.

As represented in FIG. 2B, software operating on the netlist (that is, circuitry, such as one or more processors operating on the netlist under auspices of software) then processes the netlist file to identify an insertion point for a virtual repeater 223 based on the actual, potentially non-uniform parasitics associated with the path; the software then modifies one or more nets at issue so as to split the affected nets into two or more parts, resulting in a new temporary netlist, represented by numeral 221 in FIG. 2B.

More particularly, FIG. 2B once again shows the first and second nodes 203 and 205, and same square pulse input signal 211, as was seen in connection with FIG. 2A. Operating on the various parasitic elements represented by the PLN file, software identifies a suitable insertion point for a repeater—this point is represented by numeral 219 seen in FIG. 2A. A signaling node imputed at this point for example might correspond to a location where, with proper termination, the square pulse signal 211 is still recognizable, with insubstantial delay, such as represented conceptually by voltage waveform 231 depicted in FIG. 2B. The edge representing change in logic state, for example, is seen to be nearly vertical in the case of waveform 231 (i.e., with high edge slew rate). The software divides the original net for the signaling path, represented by numeral 201 in FIG. 2A and the associated parasitic elements 207, into an upstream net 237 and a downstream net 239, with the virtual repeater 223 being represented as a terminating capacitance (load capacitance) in the upstream net, as represented in FIG. 2A by presence of a capacitor 227, and with the virtual repeater 223 being represented by a resistor 229 (e.g., output driver resistance) in the downstream net 239. This is to say, the virtual repeater is not required to exist in the design at this point, and is simply represented by a collection 225 of parasitic elements in a modified netlist (or portion thereof) which will be used to model and select a suitable repeater cell or design at a later point in time. The upstream net 237 and the downstream net are re-simulated at this point, with the upstream net being modeled as a signal source having an output resistance as the front end of the downstream net—For example, the same original square pulse 211 which was input to the upstream net is re-simulated to result in a signal which arrives at the virtual repeater insertion point with higher slew-rate and lower attenuation and delay, as represented by waveform 231. This signal is vetted against designer-specified criteria (i.e., so as to justify an assumption that the signal is correctly received by and interpreted by the repeater), and is "virtually" retransmitted by a driver (which results in a new square wave signal 233 having proper edge, marginal delay and suitable drive voltage). The downstream net, having substantially less parasitics than the original (unmodified path) thus presents substantially reduced capacitive loading on the new square wave signal 233, and software simulates a receive signal as seen at the right side of FIG. 2B, as designated by waveform 235. As illustrated in FIG. 2B, because of the presence of the virtual driver at a path midpoint, and the reduced overall RC delay, the receive signal as depicted now has substantially less delay, attenuation and edge variation when compared to the waveform 213 discussed above in connection with FIG. 2A. In this particular scenario, when presented with a design modification suggested by a computer-aided design tool, with suitable visualization, a designer might conclude that such an optimization should be accepted (with or without further changes). Note that such a result may not always be the case, depending on the IC design at issue, the associated application, and the preferences of the designer; for example, it might well be that the waveform 213 seen in FIG. 2A is acceptable for the application at-hand without modification. Conversely, for a given design, greater (unacceptable) delay might be caused by repeater insertion than without repeater insertion, and the proposed insertion might be rejected. The techniques exemplified by FIGS. 2A and 2B advantageously provide automated suggestions to aid a designer's selection of circuit modifications and to speed-up the process of evaluating possible design optimizations, and they thereby provide for a faster, more efficient integration design process. Note that not all of these steps are required in all embodiments; for example, in one scenario, a designer can manually select a proposed insertion point, with software then providing a visualization mechanism for optimizations, i.e., as a designer modifies repeater design, "temperature" (discussed below) is indicating so as to permit the designer to immediately understand whether modification results in positive or negative changes in the proposed design. In a different scenario, the software suggests—or automatically selects—repeater particulars, with a designer optionally being presented with an opportunity to optimize and/or ratify the choices made by software. Naturally, these scenarios are non-limiting.

With principles of a set of techniques for virtual repeater insertion thus introduced, this disclosure will now proceed to a detailed examination of more detailed embodiments, with reference to FIGS. 3-7.

Figure 3:
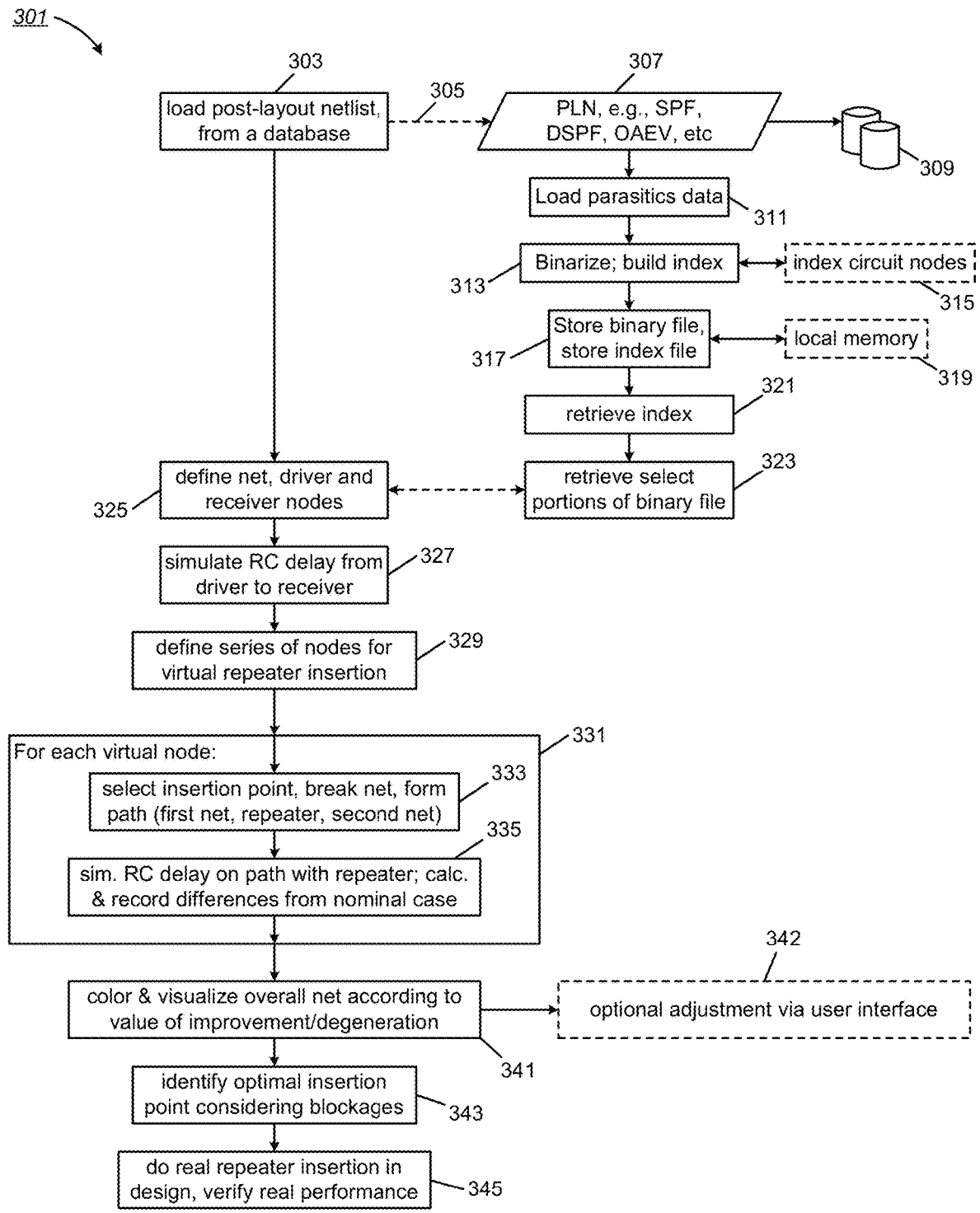
FIG. 3 is a block diagram showing another embodiment of techniques for virtual repeater insertion.

FIG. 3 shows another embodiment 301 of techniques for virtual repeater insertion. More particularly, as represented by numeral 303, a PLN file 303 is first loaded from a database. If this file and its associated parasitic representations do not exist, these things are extracted, as conceptually represented by numeral 305. As discussed above, a suitable file (307) can be a SPF, DSPF, OAEV or other type of parasitics' representation. For a typical IC design, the size of this file will often be enormous, and the file can be advantageously stored in mass memory, for example, in slow access memory (e.g., network-attached storage) represented as a data center or disk-based storage (represented by numeral 309).

It was earlier-mentioned that in one embodiment, techniques are used to facilitate efficient, real-time processing based on the PLN 307. To this end, the PLN file can be binarized, to create a working copy, and this binary working copy can then be indexed in a manner such that only relatively small segments of the binary data file need be loaded and processed; these segments—or the overall binary file—can reside in local (operating) memory or in relatively slow storage (e.g., a disk, or network attached storage) depending on embodiment. The embodiment of FIG. 3 relies on an offline process to advance-digest the PLN file to perform this binarization, to dramatically improve processing speed. That is, rather than operate on the ASCII character DSPF or equivalent file (which can take tens of minutes to load and/or process, depending on project size), the techniques represented by FIG. 3 convert the PLN file from ASCII to a binary form, and build an index which identifies each net (and any other desired node or point) in the binary file using a direct offset into that file, all per numerals 313 and 315. In one embodiment, the resulting binary file and index file are stored per numeral 317 in the slow access memory for future use, while the index file is also loaded into RAM (e.g., a computer workstation's local, fast-access memory), per numeral 319, for purposes of ensuing parasitics' processing; in other embodiments, the binary file and index can both be stored in RAM/operating memory. When and as a designer wishes to evaluate performance of a particular section of a given design, for example, a specific pathway for which an error has been identified (i.e., either manually or automatically by software), the stored index is retrieved (per numeral 321), is used to identify offsets to just that binary data which is needed for (real-time) processing; where the binary file is stored in "slow memory," software consequently retrieves and loads into RAM only a small portion of the parasitics' data (i.e., as opposed to an entire, potentially-massive ASCII-based PLN or other parasitics' file), as represented by numeral 323. This pre-digesting and limited retrieval of parasitics' data greatly reduces both load time and processing time, in many cases to such an extent (as referenced) that run-time parasitics' processing can be performed in real-time (i.e., instantaneously), even for large projects. In one contemplated embodiment, a memory manager can be used to perform direct memory access (DMA) in order to retrieve binary data of interest (e.g., such that ensuing processing is unencumbered by the need for file dynamic file allocation and/or virtual address translation).

As represented by FIG. 3, a designer can be prompted by software to specify any or all of a given circuit/IC design (e.g., a specific PLN file), a designer-specified circuit design characteristic that is to be gauged (e.g., selected from a drag-down list), a set of excitation/observation points that are to be analyzed, and any other designer-desired processing filters, per numeral 325. These items for example can be entered via a workstation or other processor-based device having one or more conventional user-interfaces, such as touch-screen, display screen, keyboard, mouse (or other cursor-control device), microphone, AR/VR system, or other input device. As just described, these inputs can be used to select and retrieve into RAM an index file, created as represented above, and to load only isolated portions of the PLN file needed for specific path analysis. The method/software then proceeds to compute transient response (or other response to a test signal simulation) for one or more paths represented by any designer-selection, per numeral 327, simulating for example RC effects and associated signal degeneration for those paths. Based on this analysis, in this embodiment, the software then automatically identifies errors and an associated set of nodes for virtual repeater insertion, and it identifies a number of repeaters to be inserted, conceptually as few as zero to potentially any number, per numeral 329. It then performs a series of steps 331 for each proposed virtual repeater insertion. The number of repeaters for any given path can, depending on application, be selected to roughly correspond to n, where a $2^n$ boost (or reduction in delay or increase in slew rate) is needed to produce a minimally-acceptable signal with some buffer; for example, if it is desired to double signal strength, a single repeater may suffice, whereas two repeaters might be desired for 2-4× boost/improvement, three repeaters for a 4-8× improvement, and so forth. As to steps for insertion of each virtual repeater, software selects a tentative insertion point (333) based on analysis of the parasitic elements from the PLN file (e.g., corresponding to a path length where a broken, "upstream" net will result in signal degeneration no greater than a predetermined threshold). The software then identifies upstream and downstream nets based on this path length or the closest available node from an parasitics' perspective; per numeral 335, the software then simulates RC delay on each net (i.e., upstream and downstream) and records differences from the nominal case (i.e., for which no virtual repeater is represented). Once this is done for all proposed repeater insertion points for a given path, simulation measurements are recalculated and updated for the pathway of interest (e.g., and each downstream net, to provide for visualization and further, optional optimization). That is, while in one embodiment, it is of course possible to insert repeaters automatically, in another embodiment, changes are recorded and made available for designer's review, for optional designer selection of repeater cell and/or insertion point(s), for a designer's elective adjustment of an automatically-propose modification, and/or for a designer's validation of a potential design change. Optionally, such a display is highlighted or colored (341) to dynamically emphasize improvements/changes in performance associated with a proposed modification; such a comparative display can optionally be based on a graphical rendering of structures. As noted, per numeral 339, a designer/user can be afforded the opportunity to electively vary design modifications, for example, by adjusting repeater cell selection, driver size, position and/or opting for other design modifications (e.g., changing layout as an alternative to repeater insertion). In response to user actions/adjustments, the software can interact with the user to identify optional insertion points, considering any blockages (i.e., per numeral 343). For example, as noted earlier, software can be configured to only accept repeater insertion at predetermined nodes (e.g., preventing for example virtual repeater insertion in the middle of a via), or to automatically select modifications and/or alternatives (e.g., different cell selection/repeater size) when a desired placement point should be blocked. Finally, per numeral 345, once the designer validates the modified design, as appropriate, software can insert a specific repeater design or cell in the underlying IC circuit layout (e.g., in the pre-netlist layout) such that the IC design is in fact modified to newly reflect the repeater presence (for example, an inserted buffer).

Figure 4A:
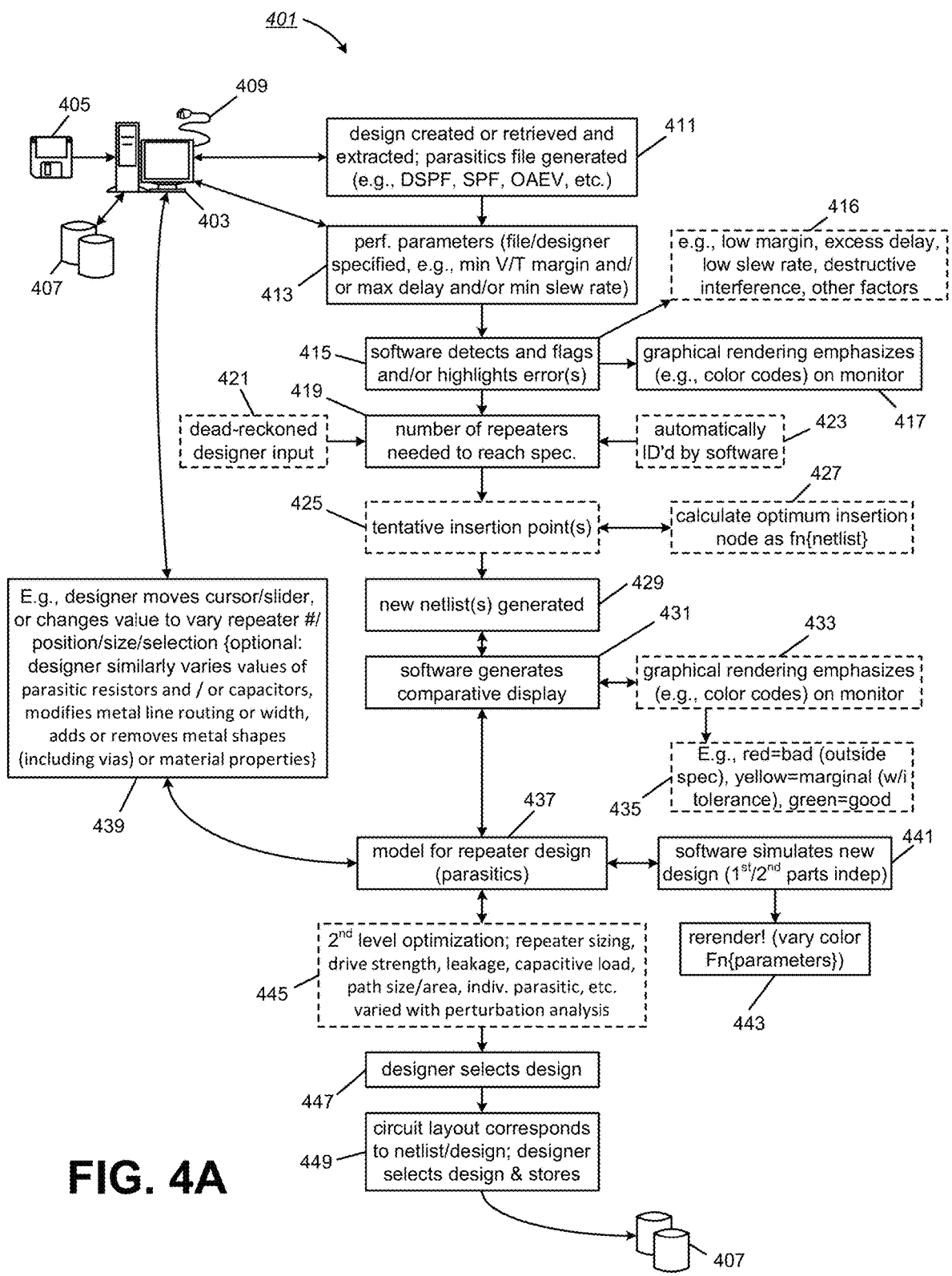
FIG. 4A is a block diagram showing yet another embodiment of techniques for virtual repeater insertion.

FIG. 4A shows yet another embodiment 401 of techniques for virtual repeater insertion. As with the other methods disclosed herein, these techniques can be embodied as software, for example, as instructions stored on non-transitory storage media that, when executed, cause or configure circuitry, such as a set of one or more general purpose processors, to function in a predetermined manner, according to the instructions. For example, FIG. 4A exemplifies a system including a computing device 403 (such as a server, laptop, tablet or workstation), software (instructions for such a computing device, stored on nontransitory storage media (represented conceptually by a floppy disk icon 405), disk-based or other off-device storage 407 (e.g., network attached storage), and one or more user interfaces (conceptually represented by a depiction of a display monitor and a mouse 409). A designer uses tools such as these to create an IC design or to retrieve a layout file (or PLN file corresponding to such a design/layout), as represented by numeral 411. Using these tools, for example a keyboard and mouse, the designer enters desired performance parameters that will serve as error criteria, as discussed earlier; for example, as denoted by numeral 413, these criteria can establish and/or modify minimums, maximums or bins of marginal performance associated with voltage and/or timing margins, RC delay, edge slew rate, and/or other performance criteria. The software and/or its supporting circuitry then act upon this error criteria and detect/flag any errors represented by processing of the underlying PLN file/error criteria, per numeral 415. As before, software optionally benefits from the acceleration techniques described earlier for processing voluminous PLN files. Also as before, software renders pertinent structures for the designer, such that the designer can visualize a 2D or 3D layout with highlighting/colorization to readily identify associated problem areas. Our incorporated by reference patent application, U.S. Utility patent application Ser. No. 16/429,007, for example, describes how a parasitics file can be processed to identify sensitivities of various performance parameters (e.g., RC delay experienced by a signal traveling along a path) to individual parasitics, with individual polygons (e.g., portions of paths) colorized or otherwise emphasized to indicate relative impact of that portion on the overall parameter of interest. Similarly, our incorporated-by-reference patent application U.S. Utility patent application Ser. No. 16/434,454 extends many of these techniques to matched-net analysis, providing (among other things) for visualization of matched path discrepancies (e.g., relative performance, highlighted according to "temperature"). [Note that as used herein, "temperature" refers to any relative display or indication where a designer is provided with data representing a comparison between structures and/or error criteria, i.e., such that the designer can both identify problems and the magnitude of problems, e.g., via highlighting, colorization, animation, or other emphasis; in some embodiments, "temperature" is manifested as a color-based display that uses a host color such as "red" to indicate problems and cool colors, such as "green" or "blue", or no color at all, to indicate lack of problems.] These techniques are advantageously employed by software in one embodiment to present graphical displays (per numeral 417) so as to highlight bottlenecks/problem areas, and so as to dynamically recolor those areas as designer-supplied dynamic adjustments reduce or eliminate the problems; in turn, this provides an intuitive design tool that permits a designer to "learn" how to intuitively solve design issues associated with RC delay. As was the case before, the software identifies a number of repeaters for each problem path needed to modify that problem path so as to not violate the user supplied error criteria, per numeral 419. In one embodiment, simulated performance characteristics can be presented to a user, who then dead-reckons repeater insertion (and the number of repeaters), per numeral 421; per numeral 423, in other embodiments, these tasks can also or instead be partially or fully automated by software, with the software suggesting both a number of repeaters for each pathway of interest and their insertion points. As indicated earlier, in many embodiments, each insertion point selected by the designer or software can be selected, per numerals 425/427, based on an analysis and/or rendering of parasitic elements (or associated sensitivities of a performance characteristic to sensitivities). Software then generates a new (temporary) parasitics' representation, by modifying original PLN data so as to define upstream and downstream nets using the process described above. A comparative display can be visually presented to the designer, as indicated by numeral 431; such a display can be based on a colorized rendering or other forms of "temperature," i.e., so as to dynamically convey simulated performance relative to either the original error criteria, or to the unmodified structure (or other modification alternatives), per numeral 433. For example, as noted above, bad performance (and/or problem areas) can be represented by red colorization, while marginal performance can be represented by other colors (e.g., a "cautionary" color such as yellow), while excellent performance relative to specification can be represented by greens and blues (or no color), all as indicated by optional block 435. With suitable points identified, and with visualization provided that permits a designer to observe relative impact in real-time of designer-modifications upon the simulated performance of the path in question, the designer is in a position to easily and intuitively modify particulars such as base repeater particulars, including without limitation, repeater insertion point, repeater type and size, repeater cell selection, and/or associated parasitics used to model a given repeater design (represented by numeral 437). For example, as conceptually represented by feedback block 439, a designer can use a cursor, slider or other input device (virtual or physical) to vary the repeater particulars, with the computing device 403 then feeding back variations to adjust a temporary PLN file (as was described earlier); transparently, the software simulates the new design (e.g., computing new upstream and downstream nets corresponding to the modified repeater insertion point) in real time, as indicated by numeral 441. This data can be immediately rerendered (443) in one embodiment, such that a colorized or temperature-based display (for example) is modified in real-time, to enable the designer to visualize the improvement as he or she makes any proposed modification.

Once a tentative design is selected, the software can optionally invoke a second or third level design optimization process (445) based on virtual repeater presence. For example, in one embodiment, a designer can then automatically be provided with a menu or drop down list that permits the design to swap repeater cells, or resize a repeater driver and/or associated parasitics, and observe the effects of such variation. Conversely, in one embodiment, the designer can be provided with a menu that then displays changes in performance characteristics simulated in accordance with a newly-modified PLN file. A designer after placing a repeater can be provided with functions to and/or prompted to change path sizing, reroute paths, move or add, structures, and so forth, in a way that helps further optimize the given integration design.

Once alternatives have been decided above, the designer can validate a specific design modification and commit it to storage, per numeral 447 (e.g., such that optionally, both binarized and non-binarized files are adjusted/overwritten with any designer-validated changes); the software then, either with or without human assistance, performs any further needed simulations and automatically inserts a corresponding circuit design element (e.g., a detailed repeater circuit description, corresponding to parasitics used to modeled a modified netlist) into the original layout file, making any related design changes/adjustments in the underlying design/layout file as appropriate, per numeral 449; note that any repeater parasitics used for modeling can be translated, by this process, into an actual circuit structure as dictated by the modelled parasitics, e.g., as potentially a buffer having a specific structure for one IC design, as an inverter having a specific structure for a different IC design, and so forth. A resultant design file (i.e., modified circuit design/layout) is then be committed back to slow access memory 407 (e.g., network-attached storage) for future use, for example, in automated production of integrated circuits.

Figure 4B:
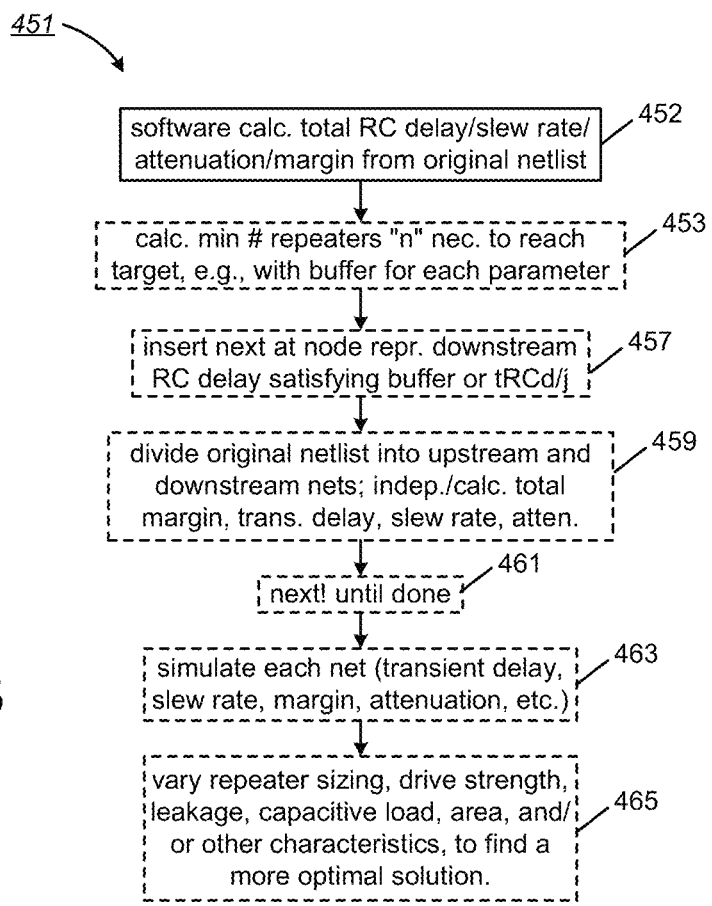
FIG. 4B is a block diagram showing yet another embodiment of techniques for virtual repeater insertion.

It was mentioned above that, in one embodiment, virtual repeater insertion points can be calculated as a function of accumulated parasitic elements based on a comparison of circuit performance characteristics for the pathway in question and any supplied error criteria. FIG. 4B presents an alternative embodiment 451 associated with identification of specific insertion points for one or more repeaters in a given net. Per numeral 452, system software first aggregates pertinent parasitic elements and simulates delay/attenuation/ slew rate, and so forth; based on this processing, it then identifies a tentative number of repeaters, e.g., the minimum number needed to reach target, e.g., accounting for designer-specified criteria for each parameter of interest, per numeral 453. The software then proceeds incrementally from the start node, applying a potential termination model and identifying hypothetical degeneration seen at various nodes descending from the transmit node to the receive node, until the designer specified-criteria for degeneration are observed (per numeral 457). For example, software can proceed until the total RC delay (tRCd) reaches a certain prorated value (e.g., tRCd/j), with a repeater then being "virtually inserted" at this node, and with the overall net encompassing this insertion node being broken into upstream and downstream portions (459), as described earlier. The software then continues with the new downstream net in the same manner, subdividing this net to insert an additional repeater, as required, until software reaches the second, receive node (461). The entire original net of interest (i.e., which was identified as a problem) is modified, and one or more "downstream nets" are then re-simulated for the pertinent design characteristics of interest, per numeral 463 (e.g., for transient delay, slew rate, margin, attenuation, etc.). Per numeral 465, sizing of the repeater, and factors affecting drive strength, leakage, capacitive load, area, and other characteristics of the repeater, can once again optionally be factored into the model (e.g., via a second optimization process), to find a more optimal solution. Subject to compliance with the designer-supplied error criteria, the design is validated and exported, with a corresponding repeater actual design then being inserted in the underlying IC design/layout.

Reflecting on the principles just discussed above in connection with FIGS. 4A-4B and the other FIGS., computer-aided design (CAD) techniques can be extended to greatly reduce the time-consuming trial and error processes referenced earlier. Operating on a parasitics representation (e.g., a netlist), electronic design automation (EDA) tools or CAD tools can be configured to automatically identify path routing where, as laid out, parasitics (e.g., affecting attenuation, delay or edge slew rate) degrade signal quality to a point that might present operational issues. The EDA or CAD tool interacts with the designer to recommend and/or receive and/or permit variation of 'virtual' repeater insertion points to alleviate these issues. The insertion is 'virtual,' because the actual circuit design/layout does not yet reflect these elements as inserted or modified, and valuation occurs only in connection with a parameterized representation of a design, e.g., tied to a PLN representation. The tool or the user specifies the location (node, or parasitic resistor) of a break point in the metal line, where presence of the virtual repeater is to be modeled. The original net (in the distributed RC model of the net) is broken into two pieces. An inserted repeater can be characterized by its load capacitance as the termination for the first piece of the net, as a driver resistance in the second piece of the net (i.e., replacing the first piece of the net insofar as the second piece is concerned, and modeling that first piece as a signal source), and intrinsic delay. Depending on embodiment, repeater parameters can be selected by software, selected/specific manually by the designer, imported from a timing library of a selected repeater cell, and/or selected and/or modified through a combination of these techniques. A designer can quickly change and evaluate any specified insertion point, in GUI or script, re-run simulation, and find an optimal location and other optimal characteristics for the repeater (and potentially modify/adjust related circuit structures, e.g., such as path widths and location, nearby routing and so forth). Since no actual layout change and other verification steps are performed in connection with each change, the whole process takes a small fraction of the time required to do the actual design-based repeater insertion. Through the use of comparative displays, a designer can quickly visualize (in real-time) effects of repeater insertion and/or modification, i.e., through acceleration/binarization processes as described earlier, and associated fast simulation based on adjusted nets.

Figure 5:
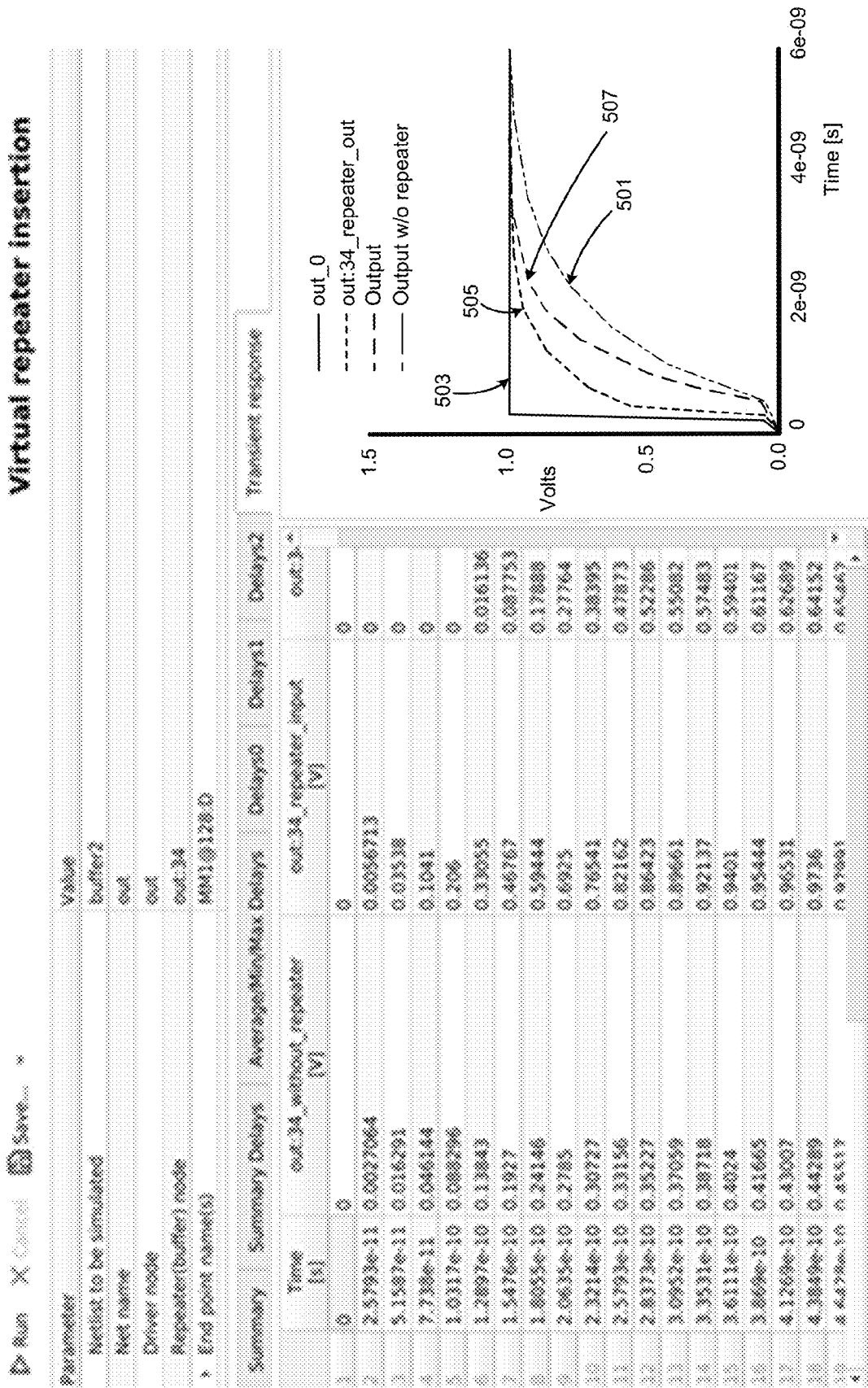
FIG. 5 is a screenshot relating to representation of delays and parasitics on a computer display screen of a designer.

FIG. 5 provides a screenshot showing a rendering on a display monitor of data associated with the process of computer-assisted virtual repeater insertion. Three panes respectively at the top center, bottom left and bottom right of the screenshot respectively identify netlist parameters, simulated RC delay values, and edge slew rate for an example application. In the depicted case, an original net "out" is probed at three points, represented in the bottom-right edge-slew-rate chart by curves 501, 503, 505 and 507, respectively representing probing of a device instance pin ("output without repeater"), a net input (e.g., an output of a transmitter, corresponding to a square-wave pulse, measured at "out_0"), a probe point corresponding to virtual repeater insertion (e.g., representing a probe point where the net "out" has now been split into upstream and downstream nets, and corresponding to a probe point at the terminus of the upstream net), and a new simulated output ("output," representing a probe point at the device instance pin with the repeater inserted). The software presents a comparative display with a repeater "virtually" inserted into the inferred design, i.e., with such not (yet) being represented in the actual circuit layout or design, but instead being modeled on the basis of divided nets, as described above, and the depicted curve 507 shows simulated improvement in edge slew rate with the repeater inserted as contrasted with curve 501 corresponding to the simulated degradation of the same input signal with no repeater inserted. A designer provided with a comparative display in this manner would likely conclude that repeater insertion significantly improves signal characteristics. With further techniques disclosed herein that permit a designer to vary parameters such as repeater insertion point, size, and other parameters, and with adjusted display (e.g., corresponding changes presented to curve 507 based on such adjustments, made and visualized in real time), a designer can select repeater specifics that produce an optimized/desired result. Selected repeater specifics can then be stored and used to configure repeater cell insertion in the original circuit design/layout.

It was earlier stated that some of the embodiments presented herein can identify an optimal repeater insertion point in real-time and provide the designer with visualization and an associated intuitive understanding as to how repeaters should be placed. FIGS. 6A-6F are used to provide additional detail on these advantages and how a "temperature-based" rendering, e.g., with sensitivities and/or improvements rendered in color on a computing device display screen, can be used to assist the designer. Generally speaking, "hot" colors such as red are used to denote bottlenecks, while "cool" colors such as green and blue denote areas of acceptable/improved performance.

Figure 6A:
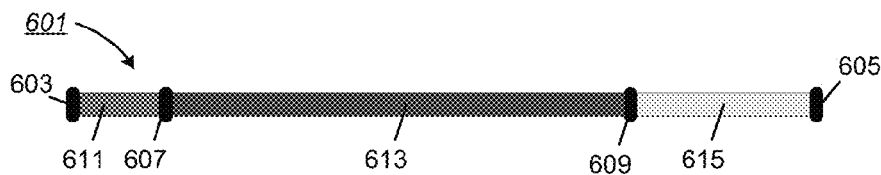
FIG. 6A is a color view showing a hypothetical circuit path.
Figure 6B:
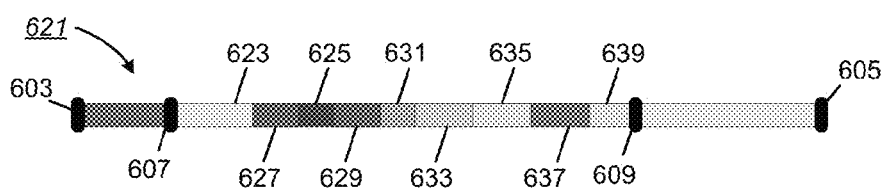
FIG. 6B is another color view showing a hypothetical circuit path; a specific segment 613 from FIG. 6A is now seen to be broken up into polygons representing different sensitivities, i.e., the RC delay along segment 613 from FIG. 6A is non-uniform in this example.

More particularly, FIG. 6A shows a color representation of a signal path 601, extending from a first node 603 to a second, destination node 605, and with two intermediate nodes represented, 607 and 609. Three nets are conceptually represented by this depiction, including a first net 611 colored in green, a second net 613 colored in red, and a third net 615 colored in yellow. The coloring in this case represents sensitivity of a performance characteristic of the depicted signal path (e.g., RC delay) to parasitics associated with an associated net; red represents high sensitivity, yellow represents intermediate sensitivity, and green represents low sensitivity. In this case, it is assumed that the depicted path 601 has unacceptable RC delay (i.e., based on simulation) and that it is desired to insert a repeater at an appropriate location. Conventionally, a designer eyeballing the schematic or layout would have no ready ability to intuitively understand that the associated parasitic elements—and thus the sensitivities—are non-uniform for the depicted path. FIG. 6B extends this analysis, providing a more detailed breakdown 621 with the second net now divided into various subnets, once again with colors used to demark relative sensitivity (e.g., and with red-orange color, such as represented by subnets 627 and 629 representing less sensitivity that red subnet 625, with light orange color (e.g., subnet 631) representing still less sensitivity, and with dark yellow, yellow, blue and green light of subnets 633, 623, 635, 639 and 637 representing still decreasing levels of sensitivity of a performance characteristic (e.g., RC delay) to parasitics associated with a portion of the routing/signal path. As can be seen from the colorized display represented by FIG. 6B, non-uniformities for the depicted hypothetical path are such that much of the sensitivity-linked RC delays/bottleneck issues arise in the first half of the path, particularly from subnets 625, 627 and 629. A designer presented with such a temperature-based display, or software provided with associated data, in accordance with embodiments discussed above, can derive optimal repeater insertion points predicated on an analysis of parasitic elements from the netlist file (and associated sensitivities of design parameters of interest to variation and/or relative magnitude of those parasitic elements).

Figure 6C:
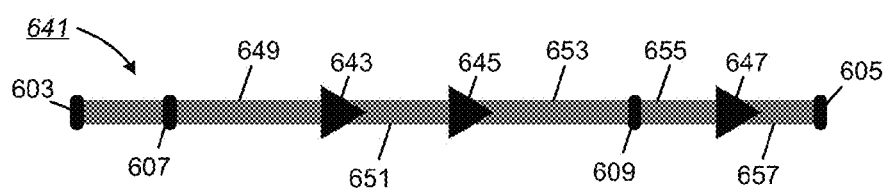
FIG. 6C is a color view similar to FIG. 6A, but this time, showing insertion of repeaters based on the non-uniformities represented by FIG. 6B.

FIG. 6C shows another representation 641 of the signal path which was introduced by FIG. 6A, but this time, with three repeaters 643, 645 and 647 being virtually inserted. The entire signal path is now depicted in green, representing that the underlying circuit path has now been "virtually" modified such that the overall path no longer violates any error criteria (in alternate embodiments, the representation 641 can be made colorless, denoting that the path no longer presents any issues). In the depicted rendering, a designer presented with side-by-side (or easily-switched) view from 6A and 6C can readily visualize (on a comparative basis, based on the colorization) that the repeater insertion at the depicted positions is expected to provide significantly improved performance over the original path represented by FIG. 6A. In this case, virtual insertion of first repeater 643 results in generating a first upstream net 649 from the net 613 (seen in FIG. 6A), a first downstream net 651 (which also serves as the upstream net for second virtually-inserted repeater 645), and a second downstream net 653. The performance characteristic of interest is remodeled based on modified PLN file data, as described earlier, and new sensitivities calculated and rendered as depicted. FIG. 6C also shows that, depending on error criteria, another repeater 647 can be inserted, with the third net 615 from FIG. 6A correspondingly broken into upstream and downstream pieces 655 and 657, and with sensitivities recalculated and rerendered for the designer. Using graphical tools, a designer can drag repeater position to visualize, in real time, how these colors change, with software in the background calculating associated changes in upstream and downstream nets, producing new simulated data corresponding to RC delays, slew rate change, rising/falling edge change, and rendering updated data so that the designer learns how adjustments affect parameters and how an optimized result can be obtained.

Figure 6D:
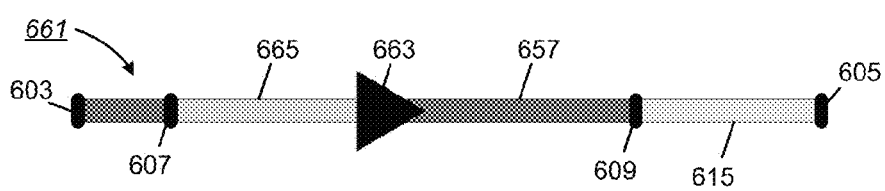
FIG. 6D is another color view, similar to FIG. 6C, but with a different number of (and differently-sized) set of repeaters.
Figure 6E:
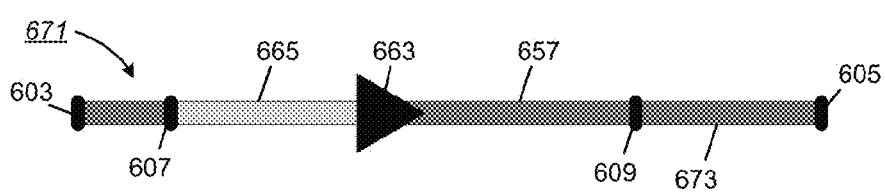
FIG. 6E is another color view, similar to FIG. 6D.
Figure 6F:
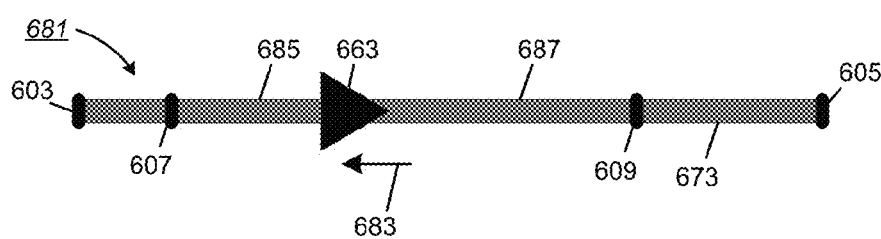
FIG. 6F is another color view, similar to FIG. 6E.

FIGS. 6D, 6E an 6F show still further alternative renderings that can be provided to the designer, either as automated software recommendations (i.e., presented alternatives) or in response to designer modification based on netlist processing, as described above. More specifically, FIG. 6D shows a representation 661 where a single repeater 663 only has been inserted, with the second net 613 from FIG. 6A now being broken into exactly two pieces 665 and 657; this single repeater is shown as enlarged, relative to the repeater of FIG. 6C, denoting that the designer has selected a larger drive strength (or different repeater cell, e.g., using a graphical slider or drop-down tool to adjust repeater specifics) in this example to provide more boost. The software resizes the repeater depiction as the designer changes virtual repeater drive size, to once again link dynamically applied changes at an intuitive level to changes in performance. In this example also, it is assumed that the third net 615 from FIG. 6A has not been modified, as the designer (or software) has elected to not insert a third virtual repeater, as was the case for FIG. 6C. FIG. 6E shows yet another alternative representation where the third net 615 from FIG. 6A has now been replaced, via structural modification of design elements (or modification of associated parasitic elements), for example, corresponding to pathway (polygon) resizing or rerouting; a new third net 673 is depicted in green, with re-colorization and rerendering (i.e., in green) denoting that this change has now improved performance of this portion of the original path without requiring additional repeater insertion. FIG. 6F shows an example where the repeater 663 from FIG. 6D has been moved (683) by the designer (e.g., using a cursor to drag-and-drop repeater position, or a slider or other tool, via a user interface device) in an attempt to provide further optimization; as depicted, new upstream net 685 is now depicted in dark green, signifying improved performance. As these various examples help illustrate, the use of a colorized (or other temperature-based) rendering can be provided to a designer, as modifications are suggested or made, and based on the parasitics and/or sensitivities of a characteristic of interest to individual parasitic elements, to observe in real-time how modifications/adjustments affect critical parameters. In turn, the associated comparative display helps facilitate development of designer intuition as to the specific changes that should be made to effortlessly and efficiently place repeaters or make other modifications to reduce or eliminate routing issues.

Figure 7:
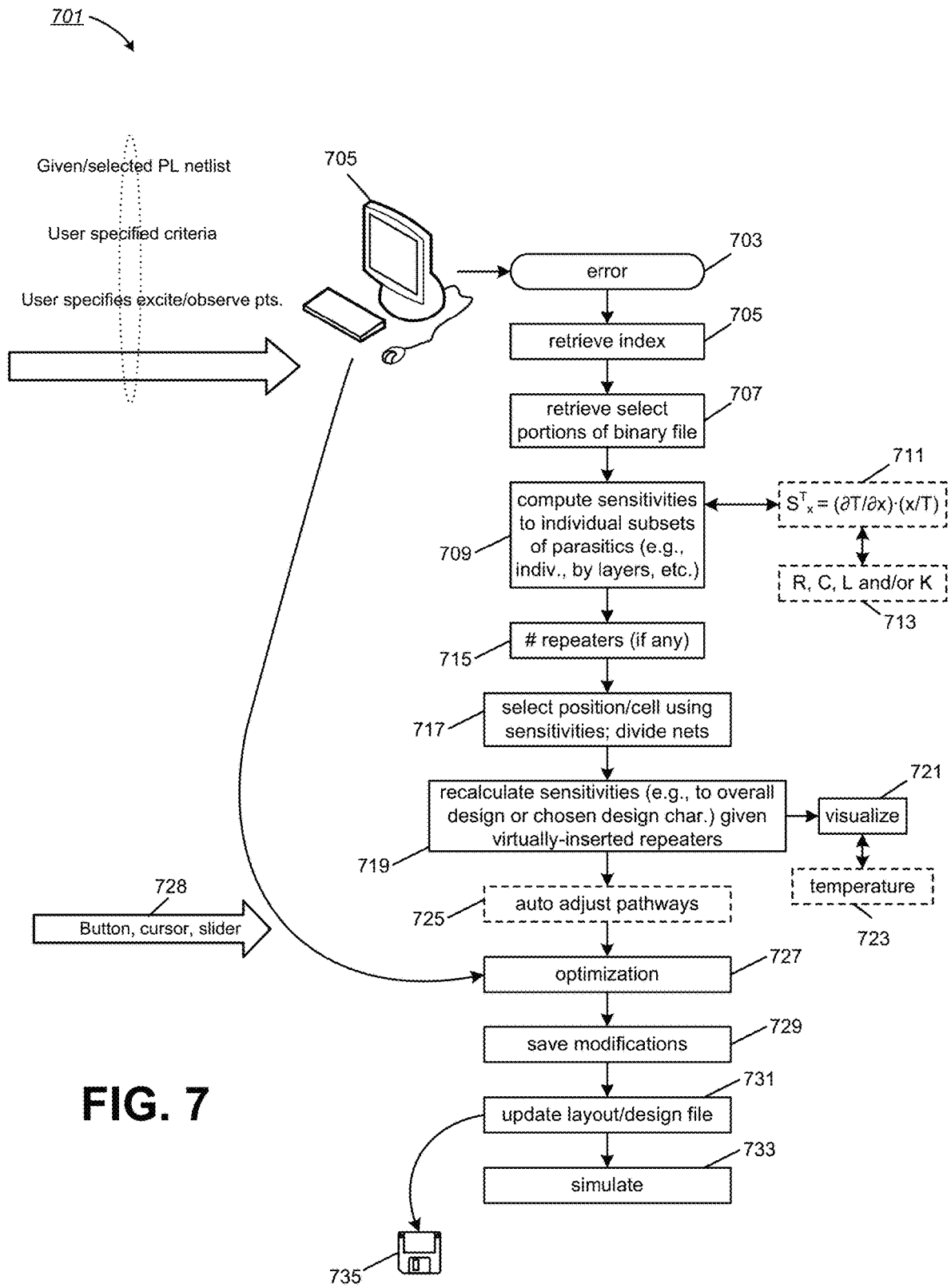
FIG. 7 is a block diagram showing one embodiment for providing virtual repeater insertion, and associated generation of an ensuing design.

FIG. 7 shows a flowchart associated with processing and displays based on sensitivities. Techniques in this embodiment are generally represented by numeral 701. As before, software models path transient response and identifies errors per numeral 703. This modeling can be for example performed for a designer-specified PLN file, identified through a computing device (and associated user interfaces) 705, along with designer specific error criteria, performance characteristics of interest, and specified paths (if any) that are to be specifically tested, as indicated at the left side of FIG. 7. For any identified nets, either flagged using error criteria, or as designated by the designer, the software retrieves the binary file index (per numeral 705) and extracts using that index just that portion of binary parasitics data from memory needed to perform processing for the net or nets of interest, per 707. This binary data can be loaded into and operated using local RAM available to the computing device. The software then computes associated sensitivities for the nets of interest, per 709, by effectively taking the partial derivative of a performance characteristic "T" with respect to an individual parasitic "x" (or alternatively, subnet), per numeral 711. As indicated by dashed-line box 713, parasitics can be any of resistance, capacitance, self-inductance, mutual-inductance, or a combination and/or derivative of these things. Based on simulated performance for the performance characteristic of interest, designer-specified error criteria, and the calculated sensitivities, the software then identifies the needed number of repeaters for each path of interest, per numeral 715, and selects both repeater cell and tentative insertion position using these sensitivities, per numeral 717. The parasitic elements of interest are then used to compute new sensitivities for new nets created via the virtual repeater insertion, and the software then re-renders a display image to be presented to the designer, per blocks 719 and 721; as before, such a rendering can optionally be temperature-based (723), such as a color-based display (as was discussed above in connection with FIGS. 6A-F). Optionally, the software can also auto-adjust (725) pathways and/or other structures represented by the design, in association with virtual insertion of one or more repeaters. The designer then uses a user interface to make any further optimizations, for example, by varying insertion node, repeater cell selection, repeater size, parasitics such as capacitance or resistance, number of repeaters, and so forth, all per numeral 727. In one embodiment, this adjustment can be performed using a visual button or a slider presented on a display monitor, or by dragging and dropping a cursor via a user interface, represented by numeral 728. Once satisfied with any modifications, the designer commands the software to save those modifications; the design file (and any associated parasitics file) is then updated, with a new design being stored to memory and being further simulated as appropriate, as variously indicated by numerals 729, 731, 733 and 735. In one embodiment, update is effectuated by modifying the parasitics' file directly (e.g., binary and/or non-binary forms) and performing further modifications based on that file before correcting the underlying layout/ design file; in another embodiment, however, the designer validation action causes the software to directly update the underlying design file to include the selected repeater cell(s), at the selected positions, as appropriate, with modified parasitics' expressions and other information used for simulation/further modeling then being newly extracted from the updated file. The result, as denoted symbolically by floppy disk icon 735, is a set of instructions for fabricating an integrated circuit (or a design filed), stored on non-transitory storage media, representing the improved integration design.

As should be apparent from the foregoing, apparatuses and method which embody the techniques described in this disclosure can provide a powerful tool for analysis and debugging of IC designs sensitive to or dominated by layout parasitics, and can greatly streamline the process of circuit layout and design optimization. Note that the described techniques provide number of advantages in terms of providing new capabilities to a circuit designer, all with substantially-enhanced speed. As these techniques are fully integratable into/with traditional platform used for circuit analysis (e.g., layout, SPICE/simulation and other EDA tools), it should be appreciated that the techniques introduced by this disclosure provide for substantial improvement in the field of EDA/CAD.

The techniques described in this disclosure can be combined in various combinations and permutations with the techniques described in the incorporated-by-reference documents. For example, as noted previously, software can identify bottlenecks and/or matching issues with bottlenecks identified and associated structures adjusted based on sensitivity analysis. In lieu of these processes (e.g., as selected by a designer) and/or for where structural adjustment using these processes first cannot relieve violation of specified error criteria, repeater insertion techniques, as discussed above, can then be employed and/or evaluated in an attempt to resolve issues. The combinations of these techniques provide an extremely powerful set of tools to quickly evaluating IC designs and variations to reduce bottlenecks and other issues.

Various other modifications/extensions will no doubt occur to those having ordinary skill in the art. For example, in alternative embodiments, the virtual design modification approach is applied to circuit elements other than repeaters/ buffers, such as to interconnect components, and so on. For example, values of parasitic resistors and/or capacitors can be changed to reflect the virtual modification of metal line widths, addition or removal of metal and via shapes, and so on. Various what-if scenarios involving virtual design modification can be explored to find the trade-offs between different characteristics (such as speed, power, area, etc.), and to find a result that satisfies the existing constraints. In many embodiments discussed herein, repeaters are modeled as parasitic elements, and evaluation is performed based on modified data from a PLN file; it is possible, however, to extend the techniques discussed herein to other mathematical representations of circuits, that is, to use other types of data and associated processing to "virtually" insert and/or modify repeaters and other structures. Also, without limiting the foregoing, the described techniques—and their variations—can be combined with or integrated into any type of conventional EDA or CAD tool.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Any incorporation by reference of documents above is limited such that no subject matter is incorporated that is inherently inconsistent with, i.e., contradictory to, the explicit disclosure herein, and no definition from an incorporated by reference document modifies, supplants or appends to any definition set forth herein, i.e., definitions set forth in this document control. Any incorporation by reference of documents above is further limited such that no claims included in the documents are incorporated by reference herein.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. In a computer-instantiated electronic circuit analysis tool, a method comprising:
   receiving into a processor-readable storage medium a post-layout netlist file representing parasitic elements extracted from a given integration design;
   with at least one processor,
      processing ones of the parasitic elements associated with a signal path, to identify a first signal response,
      identifying an error condition from the first signal response,
      dividing at least one net represented by the post-layout netlist file and corresponding to the signal path into first and second portions, and
      processing response of ones of the parasitic elements associated with the second portion which arise from a signal source replacing the first portion, to identify a second signal response; and
   causing display on a user interface device of an image formatted in dependence on the second signal response;
   wherein the method further comprises
      visually emphasizing in the image at least one of a depiction of a device and presentation of a characteristic of the device in a manner such that a degree of visual emphasis is dependent on a degree of difference between a value of the characteristic of the device and a threshold, receiving from a user interface device interactive user selection of adjustments to be applied to at least one of a device insertion point and a device parameter, the value of the characteristic being dependent on the at least one of the device insertion point and the device parameter, and dynamically reformatting the image to vary the degree of visual emphasis in association with the interactive user selection.

2. The method of claim 1, wherein the signal source corresponds to a repeater positioned at a location selected dependent on the first portion and the second portion.

3. The method of claim 1, wherein the post-layout netlist file comprises one of a Standard Parasitic Format (SPF) file, a Detailed Standard Parasitic Format (DSPF) file, a Standard Parasitic Exchange Format (SPEF) file, or an Open Access Extended View (OAEV) file.

4. The method of claim 1, wherein dividing comprises adding a termination impedance to the first portion, and an input impedance to the second portion, and wherein the method further comprises storing a modified post-layout netlist file comprising the first portion and the second portion.

5. The method of claim 4, wherein the termination impedance and the output impedance each correspond to a design model for a signal repeater, and wherein the method further comprises automatically modifying an electronic design file corresponding to the post-layout netlist file, to insert the signal repeater.

6. The method of claim 4, wherein the termination impedance comprises a capacitance and wherein the input impedance comprises a resistance.

7. The method of claim 1, wherein dividing the at least one net comprises using the at least one processor to automatically identify a node for insertion of a virtual signal repeater, wherein the second signal response corresponds to a transient response to a signal injected at the identified node, the signal corresponding to the virtual signal repeater, and wherein processing ones of the parasitic elements associated with the second portion comprises simulating the transient response using the ones of the parasitic elements associated with the second portion but not the ones of the parasitic elements associated with the first portion.

8. The method of claim 7, wherein using the at least one processor to automatically identify the node is performed in a manner where node location is selected dependent on parasitic elements from the post-layout netlist file which are associated with the signal path.

9. The method of claim 1, wherein the method further comprises receiving, via a user interface, data representing a dynamically-selected error criterion, and wherein identifying the error condition is dependent on the dynamically-selected error criterion.

10. The method of claim 1, wherein causing the display comprises creating a display image, to be presented to a user via an electronic display monitor, in dependence on the second signal response, and storing the display image in computer-accessible memory.

11. The method of claim 10, wherein creating the display image comprises rendering the display image in a manner dependent on the first signal response.

12. The method of claim 10, wherein dynamically reformatting the image to vary the degree of visual emphasis in association with the interactive user selection further comprises coloring the display image in a manner where color is dependent on at least one of a change in the degree of difference which is associated with the user selection or a delay improvement.

13. The method of claim 1, wherein the method further comprises:
receiving a signal evaluation criterion;
identifying a signal response characteristic corresponding to the signal evaluation criterion;
identifying, in response to identification of the error condition, an initial proposed device insertion point; and
automatically choosing the initial proposed device insertion point according to the ones of the parasitic elements associated with the second portion, wherein the ones of the parasitic elements associated with the second portion represent a predetermined fraction of RC delay associated with the first signal response.

14. The method of claim 1, wherein the user interface device from which the interactive user selection of adjustments is received is a graphical user interface, and wherein causing the display comprises displaying the reformatted image via the graphical user interface.

15. The method of claim 1, wherein
receiving the post-layout netlist file comprises converting the post-layout netlist file to a binary format, storing the binary format in a main memory, and creating an index to the binary format and receiving the index into a local memory;
processing ones of the parasitic elements associated with a signal path, to identify a first signal response, comprises
identifying one or more signal nets relevant to the signal path,
identifying within the binary format one or more locations of the ones of the parasitic elements associated with the signal path from the identified one or more signal nets and from the index,
loading a non-exhaustive subset of the binary format corresponding to the one or more locations from a main memory to a local memory, and
processing parasitic elements represented by the non-exhaustive subset to identify the first signal response; and
processing response of ones of the parasitic elements associated with the second portion which arise from a signal source replacing the first portion, to identify a second signal response, comprises processing parasitic elements represented by the non-exhaustive subset to identify the second signal response.

16. An apparatus for use as part of a computer-instantiated electronic circuit analysis tool, the apparatus comprising instructions stored on non-transitory, machine-readable media, the instructions to cause when executed a computer to:
receive into a processor-readable storage medium a post-layout netlist file representing parasitic elements extracted from a given integration design;
with at least one processor,
process ones of the parasitic elements associated with a signal path, to identify a first signal response,
identify an error condition from the first signal response,
divide at least one net represented by the post-layout netlist file and corresponding to the signal path into first and second portions, and process response of ones of the parasitic elements associated with the second portion which arise from a signal source replacing the first portion, to identify a second signal response; and cause display on a user interface device of an image formatted in dependence on the second signal response;

wherein the instructions when executed are further to cause the computer to visually emphasize in the image at least one of a depiction of a device and presentation of a characteristic of the device in a manner such that a degree of visual emphasis is dependent on a degree of difference between a value of the characteristic of the device and a threshold, receive from a user interface device interactive user selection of adjustments to be applied to at least one of a device insertion point and a device parameter, the value of the characteristic being dependent on the at least one of the device insertion point and the device parameter, and dynamically reformat the image to vary the degree of visual emphasis in association with the interactive user selection.

17. The apparatus of claim 16, wherein the signal source corresponds to a repeater positioned at a location selected dependent on the first portion and the second portion.

18. The apparatus of claim 16, wherein the post-layout netlist file comprises one of a Standard Parasitic Format (SPF) file, a Detailed Standard Parasitic Format (DSPF) file, a Standard Parasitic Exchange Format (SPEF) file, or an Open Access Extended View (OAEV) file.

19. The apparatus of claim 16, wherein the instructions when executed are to cause the at least one processor to add a termination impedance to the first portion, add an input impedance to the second portion, and store a modified post-layout netlist file comprising the first portion and the second portion.

20. The apparatus of claim 19, wherein the termination impedance and the output impedance each correspond to a design model for a signal repeater, and wherein the instructions, when executed, are to cause the at least one processor to automatically modify an electronic design file corresponding to the post-layout netlist file, to insert the signal repeater.

21. The apparatus of claim 19, wherein the termination impedance comprises a capacitance and wherein the input impedance comprises a resistance.

22. The apparatus of claim 16, wherein the instructions when executed are to cause the at least one processor to automatically identify a node for insertion of a virtual signal repeater, wherein the second signal response corresponds to a transient response to a signal injected at the identified node, the signal corresponding to the virtual signal repeater, and wherein the instructions when executed are to cause the at least one processor to simulate the transient response using the ones of the parasitic elements associated with the second portion but not the ones of the parasitic elements associated with the first portion.

23. The apparatus of claim 22, wherein the instructions when executed are to cause the at least one processor to select location of the node dependent on parasitic elements from the post-layout netlist file which are associated with the signal path.

24. The apparatus of claim 16, wherein the instructions when executed are to cause the at least one processor to receive, via a user interface, data representing a dynamically-selected error criterion, and to identify the error condition dependent on the dynamically-selected error criterion.

25. The apparatus of claim 16, wherein the instructions when executed are to cause the at least one processor to create a display image, to be presented to a user via an electronic display monitor, in dependence on the second signal response, and to store the display image in computer-accessible memory.

26. The apparatus of claim 25, wherein the instructions when executed are to cause the at least one processor to render the display image in a manner dependent on the first signal response.

27. The apparatus of claim 25, wherein the instructions when executed are to cause the at least one processor to color the display image in a manner where color is dependent on at least one of a change in the degree of difference which is associated with the user selection or a delay improvement.

28. The apparatus of claim 16, wherein the instructions when executed are further to cause the computer to:
receive a signal evaluation criterion;
identify a signal response characteristic corresponding to the signal evaluation criterion;
identify, in response to identification of the error condition, an initial proposed device insertion point; and
automatically choose the initial proposed device insertion point according to the ones of the parasitic elements associated with the second portion, wherein the ones of the parasitic elements associated with the second portion represent a predetermined fraction of RC delay associated with the first signal response.

29. The apparatus of claim 16, wherein the user interface device from which the interactive user selection of adjustments is received is a graphical user interface, and wherein display of the image is performed via the graphical user interface.

30. The apparatus of claim 16, wherein the instructions when executed are further to cause the computer to:
convert the post-layout netlist file to a binary format;
store the binary format in a main memory;
create an index to the binary format;
identify one or more signal nets relevant to the signal path;
identify within the binary format one or more locations of the ones of the parasitic elements associated with the signal path from the identified one or more signal nets and from the index;
load a non-exhaustive subset of the binary format corresponding to the one or more locations from a main memory to a local memory,
process parasitic elements represented by the non-exhaustive subset to identify the first signal response; and
process parasitic elements represented by the non-exhaustive subset to identify the second signal response.

31. An apparatus comprising:
means for receiving into a processor-readable storage medium a post-layout netlist file representing parasitic elements extracted from a given integration design;
means for, using at least one processor,
processing ones of the parasitic elements associated with a signal path, to identify a first signal response,
identifying an error condition from the first signal response,
dividing at least one net represented by the post-netlist file and corresponding to the signal path into first and second portions, and processing response of ones of the parasitic elements associated with the second portion which arise from a signal source replacing the first portion, to identify a second signal response; and means for causing display on a user interface device of an image formatted in dependence on the second signal response;

wherein the apparatus further comprises means for visually emphasizing in the image at least one of a depiction of a device and presentation of a characteristic of the device in a manner such that a degree of visual emphasis is dependent on a degree of difference between a value of the characteristic of the device and a threshold, means for receiving from a user interface device interactive user selection of adjustments to be applied to at least one of a device insertion point and a device parameter, the value of the characteristic being dependent on the at least one of the device insertion point and the device parameter, and means for dynamically reformatting the image to vary the degree of visual emphasis in association with the interactive user selection.

* * * * *